US011085402B1

(12) United States Patent
Vroman

(10) Patent No.: US 11,085,402 B1
(45) Date of Patent: Aug. 10, 2021

(54) METHODS AND SYSTEMS FOR OPERATING AN ADJUSTABLE PRE-CHAMBER

(71) Applicant: Ford Global Technologies, LLC, Dearborn, MI (US)

(72) Inventor: Dennis Vroman, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/837,845

(22) Filed: Apr. 1, 2020

(51) Int. Cl.
| *F02M 23/04* | (2006.01) |
| *F02M 23/14* | (2006.01) |
| *F02M 23/00* | (2006.01) |
| *F02P 3/01* | (2006.01) |
| *F02M 27/04* | (2006.01) |

(52) U.S. Cl.
CPC .......... *F02M 23/04* (2013.01); *F02M 23/006* (2013.01); *F02M 23/14* (2013.01); *F02M 27/04* (2013.01); *F02P 3/01* (2013.01)

(58) Field of Classification Search
CPC ...... F02M 23/04; F02M 27/04; F02M 23/006; F02M 23/14; F02P 3/01
See application file for complete search history.

(56) References Cited

U.S. PATENT DOCUMENTS

| 3,911,878 | A | * | 10/1975 | Hofbauer | F02G 1/02 |
| | | | | | 123/80 R |
| 4,854,281 | A | * | 8/1989 | Hareyama | F02B 19/02 |
| | | | | | 123/292 |
| 5,127,375 | A | * | 7/1992 | Bowman | F01L 9/023 |
| | | | | | 123/90.12 |
| 5,156,123 | A | * | 10/1992 | Kawamura | F02B 19/00 |
| | | | | | 123/256 |
| 5,333,582 | A | * | 8/1994 | Kawamura | F02B 19/165 |
| | | | | | 123/254 |
| 5,454,356 | A | * | 10/1995 | Kawamura | F02D 41/401 |
| | | | | | 123/254 |
| 5,826,558 | A | * | 10/1998 | Kawamura | F02D 41/003 |
| | | | | | 123/292 |
| 6,073,605 | A | | 6/2000 | Matsuoka et al. | |
| 8,925,518 | B1 | | 1/2015 | Riley et al. | |

(Continued)

OTHER PUBLICATIONS

Glugla, C., "Systems and Methods for Fouling Reduction in a Pre-Chamber," U.S. Appl. No. 16/788,485, filed Feb. 12, 2020, 57 pages.

(Continued)

*Primary Examiner* — Jacob M Amick
*Assistant Examiner* — Charles J Brauch
(74) *Attorney, Agent, or Firm* — Geoffrey Brumbaugh; McCoy Russell LLP

(57) ABSTRACT

Methods and systems are provided for an engine having a pre-chamber ignition system. In one example, a method may include adjusting a valve coupled between a pre-chamber of an engine cylinder and a main chamber of the engine cylinder between a fully open position and a fully closed position based on whether pre-chamber ignition is desired or direct spark ignition is desired. In this way, the engine may be operated with direct spark ignition during conditions when pre-chamber combustion has reduced stability without including additional spark plugs and air injectors.

17 Claims, 8 Drawing Sheets

(56) References Cited

U.S. PATENT DOCUMENTS

| | | |
|---|---|---|
| 9,353,674 B2 | 5/2016 | Bunce et al. |
| 10,018,104 B2 | 7/2018 | Grover, Jr. et al. |
| 10,364,738 B2 | 7/2019 | VanDerWege |
| 10,400,696 B2 | 9/2019 | Blaxill et al. |
| 2011/0072801 A1* | 3/2011 | Lupescu ............... F02M 26/06 60/287 |
| 2012/0103302 A1 | 5/2012 | Attard |

OTHER PUBLICATIONS

Glugla, C. et al., "Systems and Methods for Ignition Coil Multiplexing in a Pre-Chamber System," U.S. Appl. No. 16/788,468, filed Feb. 12, 2020, 89 pages.

Glugla, C. et al., "Systems and Methods for Catalyst Heating During Cold-Start With an Active Pre-Chamber," U.S. Appl. No. 16/801,561, filed Feb. 26, 2020, 55 pages.

Basmaji, J. et al., "Liquid and/or Gaseous Fuel Delivery System and Methods Thereof," U.S. Appl. No. 16/811,945, filed Mar. 6, 2020, 50 pages.

* cited by examiner

METHODS AND SYSTEMS FOR OPERATING AN ADJUSTABLE PRE-CHAMBER

FIELD

The present description relates generally to methods and systems for engines having pre-chamber ignition systems.

BACKGROUND/SUMMARY

An internal combustion engine combusts an air-fuel mixture within cylinders to produce torque, which may be used to propel a vehicle. In some such engines, an ignition source is used to ignite the air-fuel mixture within each cylinder during a compression stroke. For example, in traditional spark-ignition engines, each cylinder includes a spark plug for directly igniting the air-fuel mixture within the cylinder. In other examples, the air-fuel mixture within the cylinder may be ignited by jets of hot gas and flame from a pre-combustion chamber, referred to herein as a pre-chamber. An active pre-chamber may be a walled chamber located in the clearance volume of the cylinder and may include a spark plug and a fuel injector. During engine operation, fuel is injected into the pre-chamber, and a fraction of air in the cylinder inducted into the pre-chamber via a pressure differential between the pre-chamber and the cylinder during a compression stroke of the cylinder, forming an air-fuel mixture in the pre-chamber. When ignition is requested, the spark plug in the pre-chamber actuates, igniting the fraction of the air-fuel mixture in the pre-chamber. After the fraction of the air-fuel mixture is ignited in the pre-chamber, jets of flame and hot gas may exit the pre-chamber and enter the cylinder via one or more holes in the pre-chamber walls. These jets ignite the air-fuel mixture in the cylinder to produce torque.

Pre-chamber ignition may offer performance and efficiency benefits over a traditional spark-ignition engine during some engine operating conditions. For example, a cylinder with pre-chamber ignition may operate with a leaner air-fuel ratio (AFR) than a similar cylinder of a traditional spark-ignition engine, which may lead to lower fuel consumption in the cylinder with pre-chamber ignition. In other examples, a cylinder with pre-chamber ignition may produce more power than a cylinder ignited by a spark plug due to an increased burn rate in the cylinder, which may reduce an amount of time for knocking combustion to occur and thereby allow ignition timing to be advanced further toward maximum brake torque (MBT).

However, pre-chamber systems may experience performance issues during certain engine operating conditions. For example, during low load operation, the amount of the air inducted into the pre-chamber may decrease, and low level of oxygen in the pre-chamber may result in decreased combustion stability and an increased incidence of pre-chamber misfire. In another example, during a cold start condition, a low temperature in the pre-chamber may decrease a combustion stability of the pre-chamber due to decreased fuel vaporization.

Other attempts to increase the combustion stability of pre-chamber systems across a range of operating conditions include systems for directly injecting both fuel and air into the pre-chamber. One example approach is shown by Riley et al. in U.S. Pat. No. 8,925,518 B1. Therein, a system including direct fuel injection and direct oxygen injection in a pre-chamber is disclosed. By including direct air injection in the pre-chamber, an amount of oxygen in the pre-chamber may be increased. Still other attempts to address the combustion stability of pre-chamber systems across a range of operating conditions include systems including a second spark plug in a main chamber of a cylinder in addition to a pre-chamber in the cylinder, referred to herein as a dual-spark pre-chamber system. By including a pre-chamber and the second spark plug in the main chamber of the cylinder, the second spark plug may be used during conditions when the combustion stability of the pre-chamber is expected to be relatively low.

However, the inventors herein have recognized potential issues with such systems. As one example, in systems with a pre-chamber including direct air injection, the addition of pre-chamber air injectors may increase a cost and complexity of the system and may introduce significant packaging constraints. As another example, in systems with a dual spark pre-chamber system, the addition of a second spark plug may also increase the cost and complexity of the system. Further, increasing a number of spark plugs may lead to increased repair costs.

In one example, the issues described above may be addressed by a method, comprising: adjusting a valve coupled between a pre-chamber of an engine cylinder and a main chamber of the engine cylinder between an open position and a closed position based on at least one engine operating parameter. In this way, combustion stability may be increased without additional injectors or spark plugs.

As one example, the closed position is a fully closed position that maintains the pre-chamber and the main chamber as separate chambers, whereas the open position is a fully open that integrates the pre-chamber and the main chamber into a combined combustion chamber. For example, in the fully closed position, a valve head of the valve is in direct contact with a valve seat that at least partially divides the pre-chamber and the main chamber, forming a barrier between the pre-chamber and the main chamber. The valve seat may include a plurality of orifices and/or grooves that enable fluid communication between the pre-chamber and the main chamber, and thus, when the valve is in the fully closed position, gases may flow between the pre-chamber and the main chamber via only the plurality of orifices and/or grooves. In contrast, in the fully open position, the valve head of the valve is lifted from the valve seat, unblocking a central opening in the valve seat that has a large cross-sectional flow area relative to the plurality of orifices and/or grooves, and gases may flow between the pre-chamber and the main chamber via the plurality of orifices and/or grooves as well as the central opening in the valve seat.

As another example, the pre-chamber includes a spark plug coupled therein, and no other spark plugs are coupled to the engine cylinder. As such, actuating the spark plug may provide ignition across all operating conditions. However, actuating the spark plug may provide pre-chamber ignition or direct spark ignition based on whether the valve is in the closed position or the open position, respectively. Therefore, the valve may be adjusted to the fully closed condition responsive to conditions that favor pre-chamber ignition, and the valve may be adjusted to the fully open position responsive to conditions that favor direct spark ignition. For example, the at least one engine operating parameter may include a temperature of the engine, and the valve may be fully opened responsive to the temperature decreasing below a threshold engine temperature for operating with pre-chamber ignition. Conversely, the valve may be fully closed responsive to the temperature increasing above the threshold engine temperature. As another example, the at least one engine operating parameter may include engine load, and the valve may be fully opened responsive to the engine load decreasing below a threshold engine load for pre-chamber ignition and fully closed responsive to the engine load exceeding the threshold engine load.

By controlling flow between the pre-chamber and the main chamber via the valve, the engine may be transitioned between operating with pre-chamber ignition and operating with direct spark ignition. As a result, combustion stability is increased compared with providing pre-chamber ignition alone, and cylinder efficiency is increased compared with providing direct spark ignition alone, which may increase customer satisfaction. Further, the valve enables transitioning between ignition modes (e.g., pre-chamber ignition and direct spark ignition) without additional air injectors or spark plugs. As a result, a cost and complexity of the system may be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
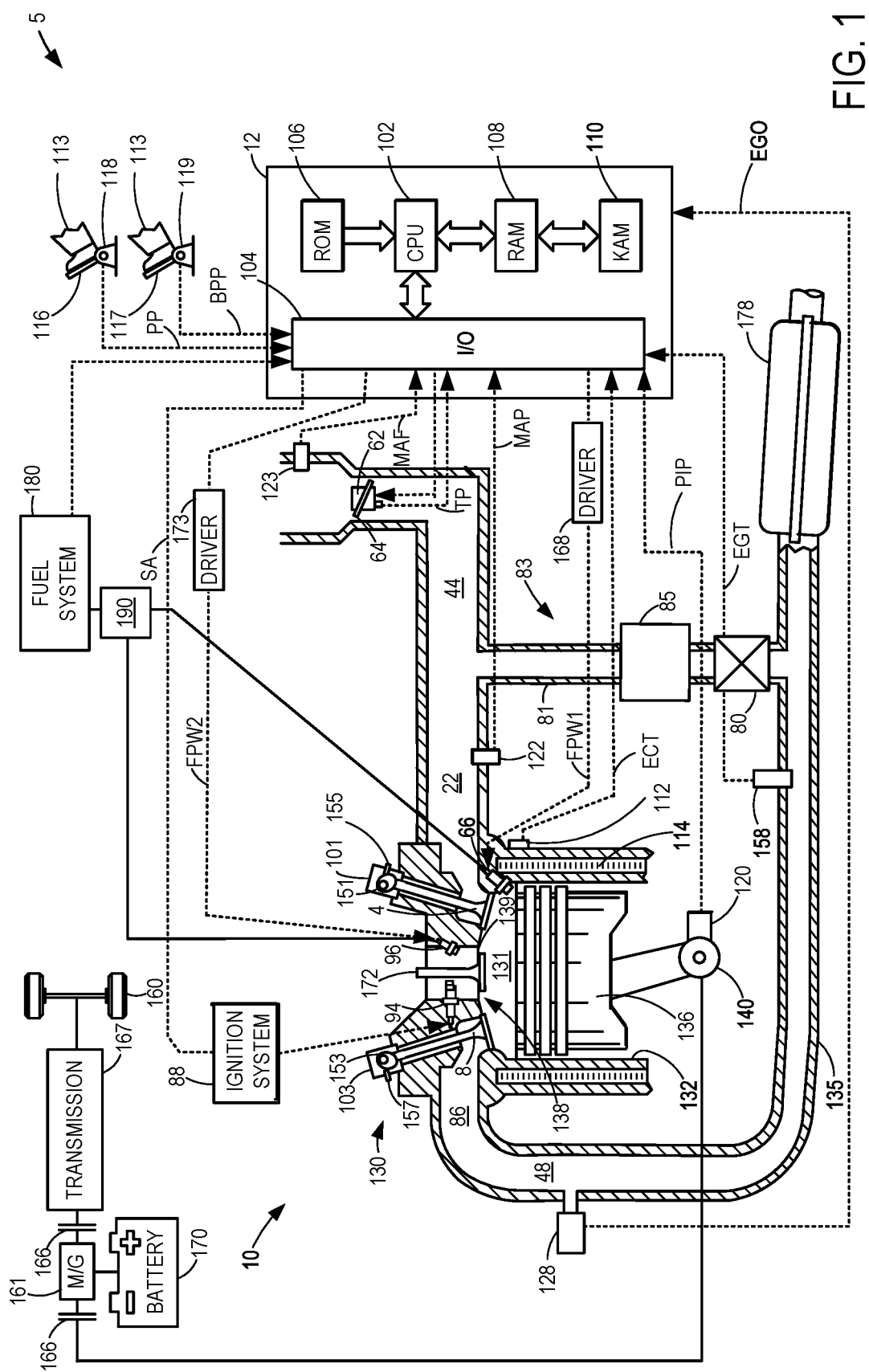
FIG. 1 shows a schematic depiction of a cylinder in an engine system of a vehicle.
Figure 2A:
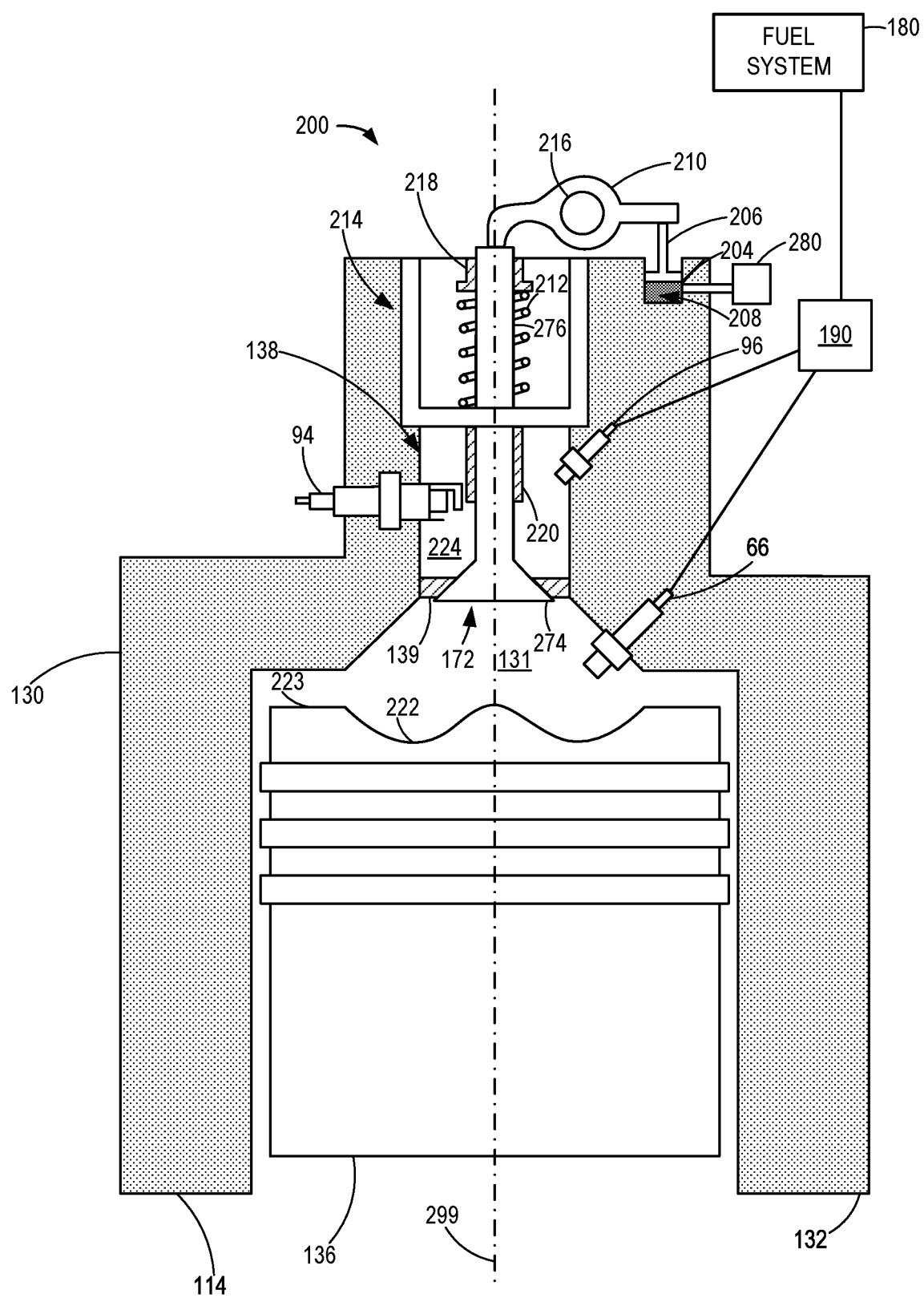
FIG. 2A shows a detailed view of a pre-chamber that may be included in the cylinder of FIG. 1, with a pre-chamber valve closed.
Figure 2B:
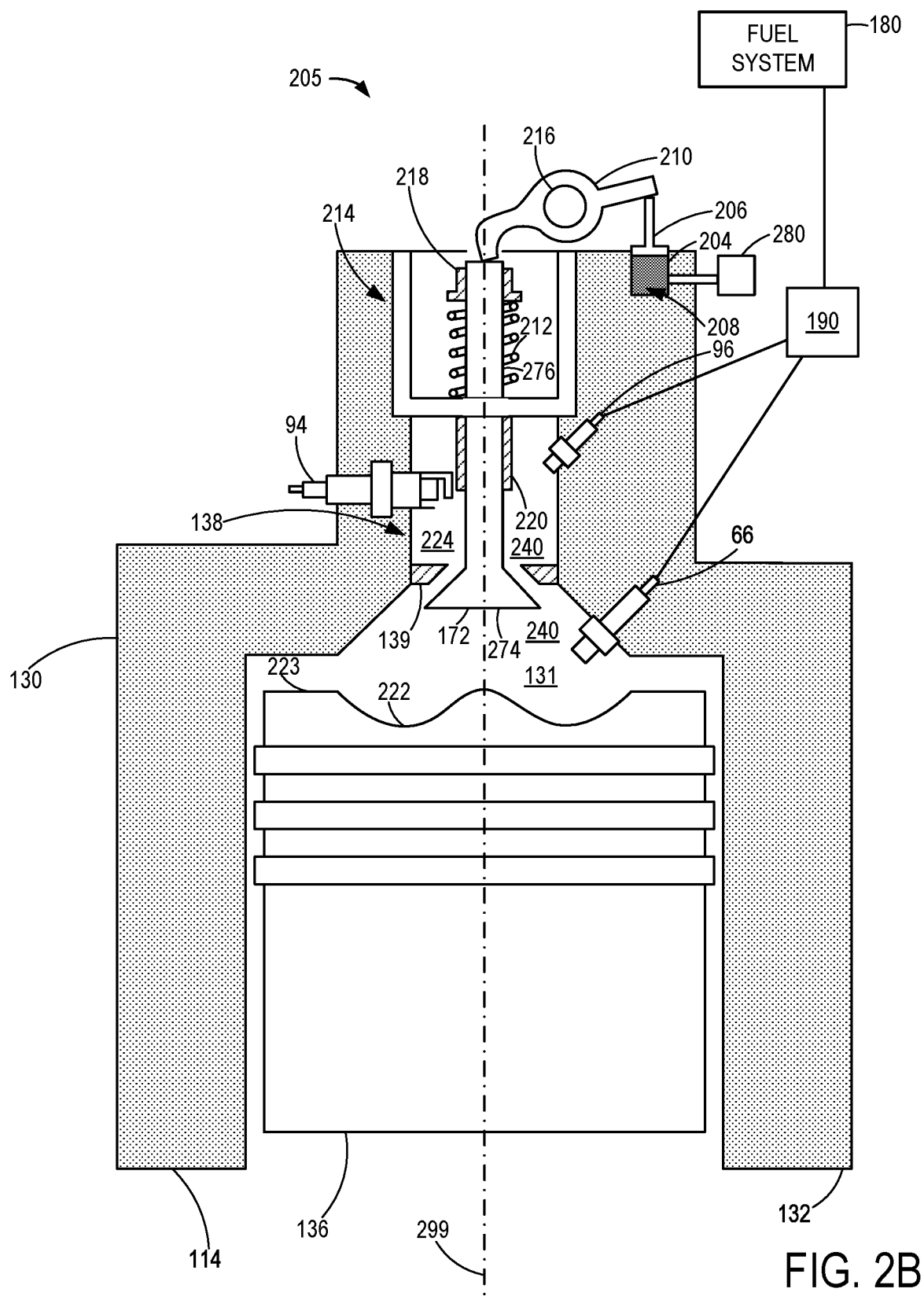
FIG. 2B shows a detailed view of the pre-chamber, with the pre-chamber valve open.
Figure 3A:
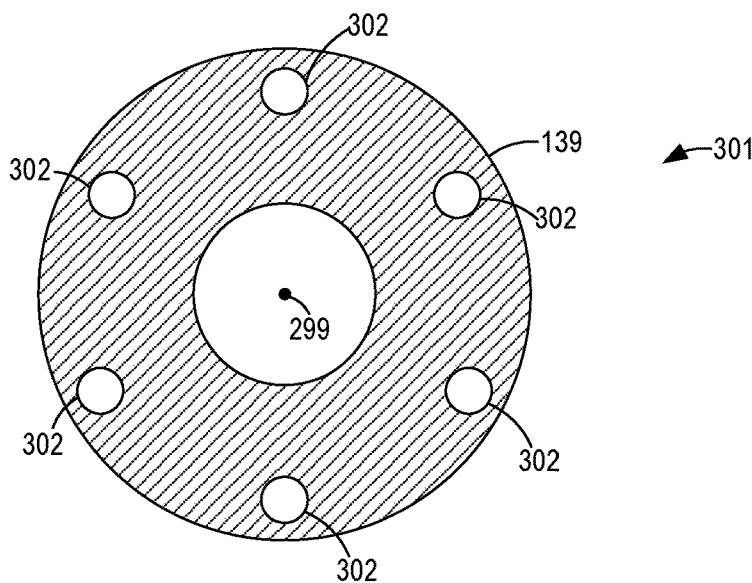
FIGS. 3A-3C show example configurations of a pre-chamber valve seat of the pre-chamber of FIGS. 2A-2B.
Figure 3B:
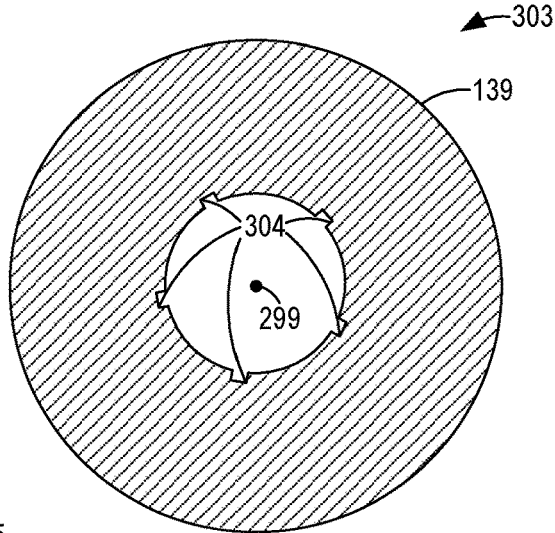
Figure 3C:
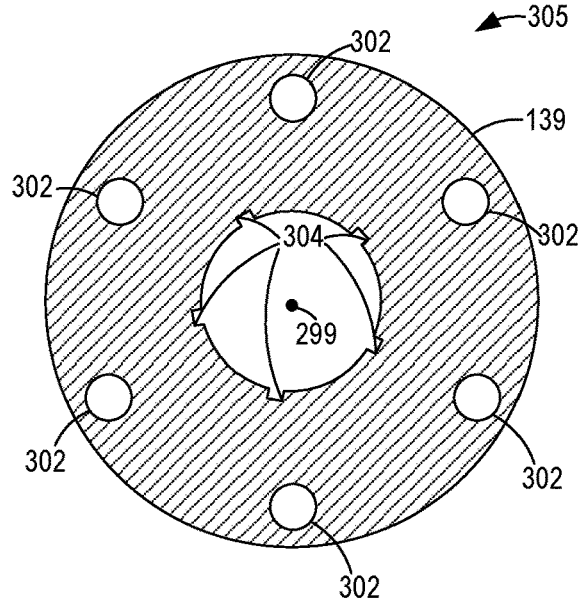
Figure 5:
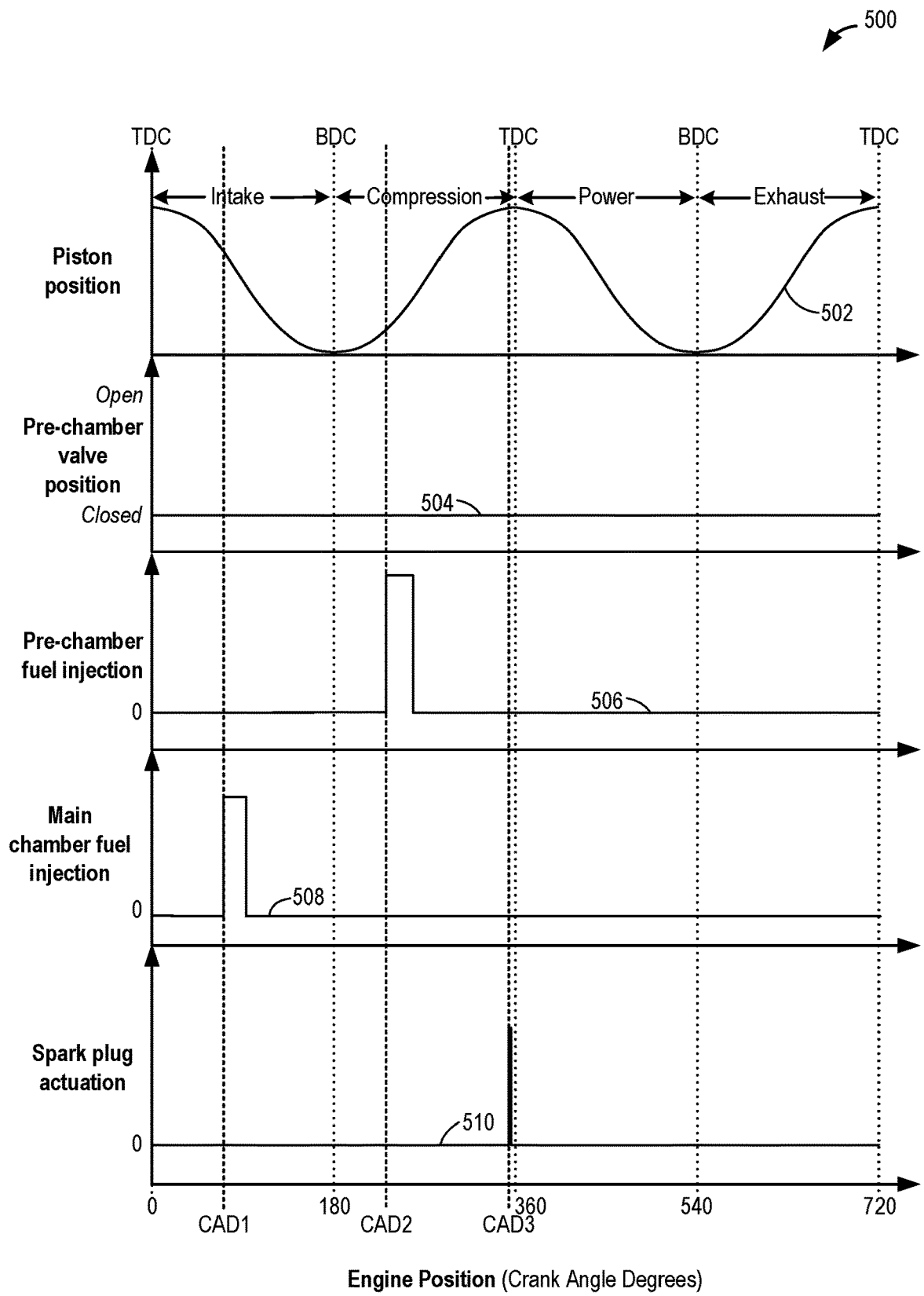
FIG. 5 shows example cylinder valve, spark, and fuel injection timings for operating a cylinder in a first ignition mode, where a pre-chamber communication valve is closed.
Figure 6:
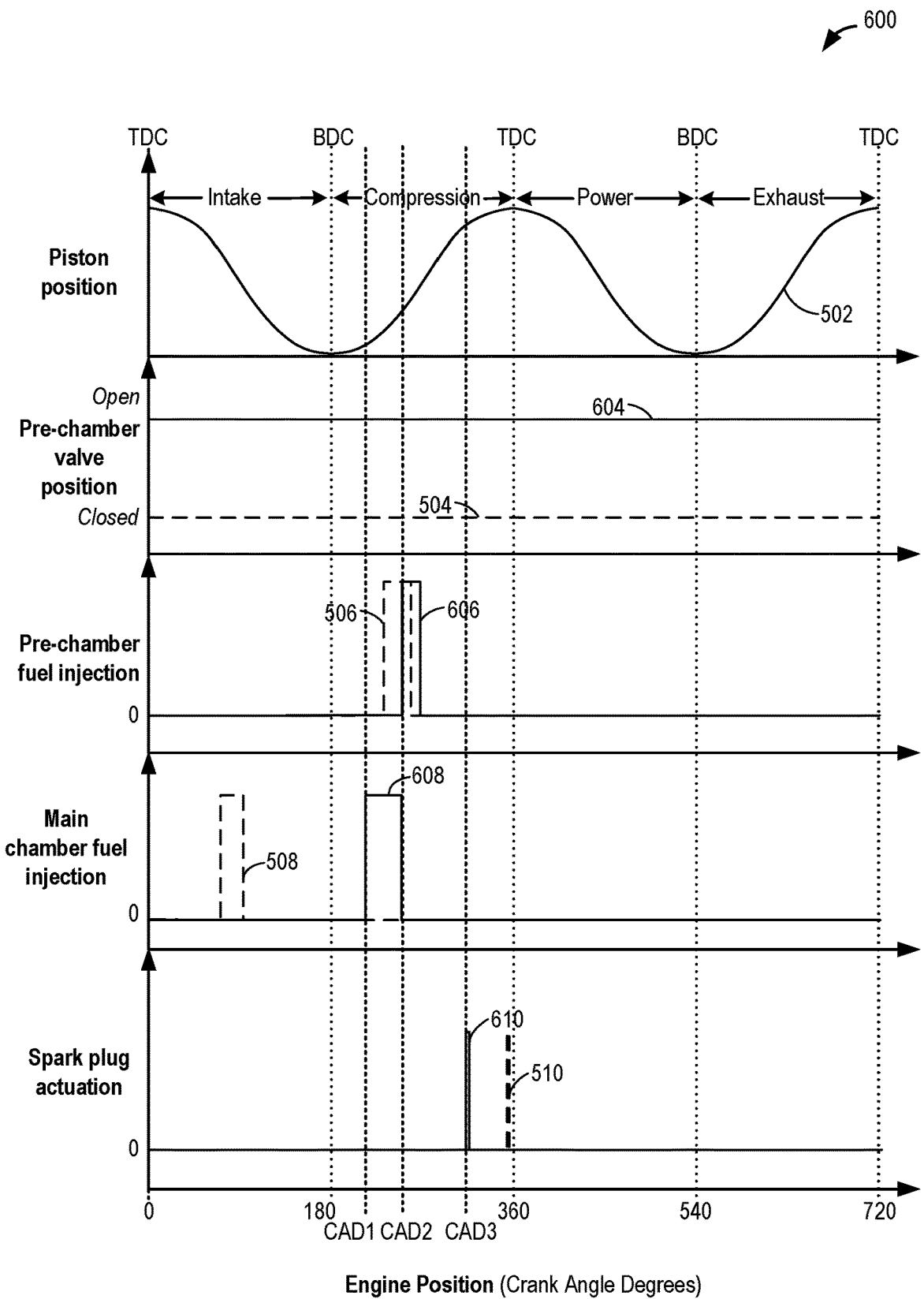
FIG. 6 shows example cylinder valve, spark, and fuel injection timings for operating a cylinder in a second ignition mode, where a pre-chamber communication valve is open.
Figure 7:
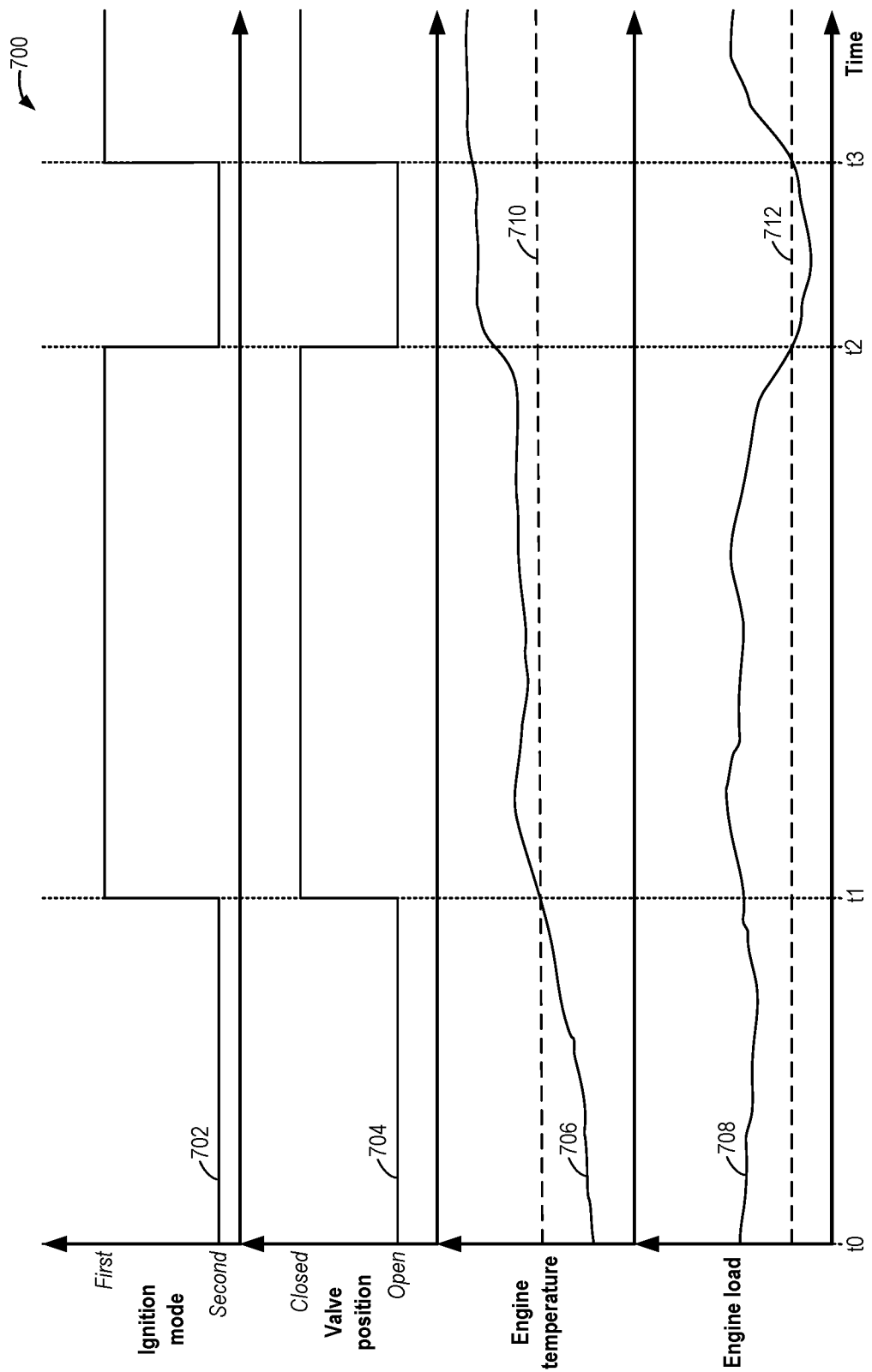
FIG. 7 shows a prophetic example timeline for adjusting engine operation to transition an engine having a pre-chamber communication valve between ignition modes based on engine load and engine temperature.

The following description relates to systems and methods for an engine having a pre-chamber system. The engine may include a plurality of cylinders, each having a cylinder configuration including an adjustable pre-chamber, as shown in FIG. 1. The pre-chamber may include a spark plug, a fuel injector, a pre-chamber valve, and a pre-chamber valve actuator, as shown in FIGS. 2A-2B. In particular, the pre-chamber valve may be closed, as shown in FIG. 2A, or open, as shown in FIG. 2B in order to vary an ignition source of the cylinder. The pre-chamber may further include a pre-chamber valve seat including a plurality of orifices and/or grooves, as shown in FIGS. 3A-3C. Further, a controller may adjust fueling, air flow, pre-chamber valve position, and spark timing in order to transition the cylinder between a first ignition mode and a second ignition mode based on engine operating conditions (e.g., engine load and engine temperature), such as according to the method of FIG. 4. FIG. 5 shows example intake and exhaust valve, spark actuation, and fuel injection timings of a cylinder operating in the first ignition mode, in which the pre-chamber valve is closed and pre-chamber combustion provides ignition, while FIG. 6 shows example intake and exhaust valve, spark actuation, and fuel injection timings of a cylinder operating in the second ignition mode, in which the pre-chamber valve is open and an ignition spark directly provides ignition. A prophetic example timeline illustrating transitioning between the first ignition mode and the second ignition mode to increase combustion stability and cylinder efficiency is shown in FIG. 7.

Turning now to the figures, FIG. 1 shows a partial view of a single cylinder 130 of an internal combustion engine 10 that may be included in a vehicle 5. Internal combustion engine 10 may be a multi-cylinder engine. Cylinder 130 includes a coolant sleeve 114 and cylinder walls 132, with a piston 136 positioned therein and connected to a crankshaft 140. Cylinder 130 further includes an internal cavity, referred to herein as a main combustion chamber (or main chamber) 131, for combusting an air-fuel mixture to produce torque. Main combustion chamber 131 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

In the depicted view, intake valve 4 and exhaust valve 8 are located at an upper region of main combustion chamber 131. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO (as depicted), a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically activated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load (as estimated via an accelerator pedal position sensor 118 and a brake pedal position sensor 119), engine speed (as estimated via a crankshaft acceleration sensor), engine temperature (as estimated via an engine coolant temperature sensor), etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid load, the amount of EGR requested may increase, and then as the engine load increases from a mid load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

As a non-limiting example, cylinder 130 is shown including a main chamber fuel injector 66. Main chamber fuel injector 66 is shown coupled directly to main combustion chamber 131 for injecting fuel directly therein in proportion to a pulse-width of a signal FPW1 received from controller 12 via an electronic driver 168. In this manner, main chamber fuel injector 66 provides what is known as direct injection (hereafter also referred to as "DI") of fuel into main combustion chamber 131. In another example, main chamber fuel injector 66 may be a port injector providing fuel into the intake port upstream of main combustion chamber 131. Further, while FIG. 1 shows fuel injected to the main combustion chamber via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

In the example shown in FIG. 1, each cylinder 130 of engine 10 includes a pre-chamber 138 disposed in or above a clearance volume of main combustion chamber 131. Pre-chamber 138 is integrated into a cylinder head of the main combustion chamber and includes a spark plug 94, a pre-chamber fuel injector 96, pre-chamber valve seat 139, and a pre-chamber valve 172, shown as a poppet valve. Pre-chamber valve seat 139 may include a plurality of flow passages to allow fluid communication between pre-chamber 138 and main combustion chamber 131 when pre-chamber valve 172 is closed, as will be further described below with respect to FIGS. 2A-3C, and may at least partially divide pre-chamber 138 and main combustion chamber 131. That is, pre-chamber valve seat 139 forms a wall (e.g., barrier) that serves as a boundary separating pre-chamber 138 and main combustion chamber 131. Together, pre-chamber valve seat 139 and pre-chamber valve 172 form a bottom surface of pre-chamber 138 and a top surface of main combustion chamber 131 when pre-chamber valve 172 is closed. Further, piston 136 is positioned in main combustion chamber 131 and does not extend into pre-chamber 138. Pre-chamber 138 is an adjustable pre-chamber in that a degree of fluid communication between pre-chamber 138 and main combustion chamber 131 may be adjusted via pre-chamber valve 172, as elaborated below. For example, when the degree of fluid communication is sufficiently high, pre-chamber 138 may no longer function as a separate chamber from main combustion chamber 131, but may form a combined combustion chamber with main combustion chamber 131.

Pre-chamber fuel injector 96 is shown coupled to pre-chamber 138 and may inject fuel directly therein in proportion to a pulse-width of a signal FPW2 received from controller 12 via an electronic driver 173. Pre-chamber valve 172 (shown in a closed position in FIG. 1) may be adjusted to increase or decrease a cross-sectional flow area, or the degree of fluid communication, between pre-chamber 138 and main combustion chamber 131. For example, controller 12 may transition cylinder 130 between operating a first ignition mode and a second ignition mode by adjusting a position of pre-chamber valve 172 based on one or more engine operating conditions, with pre-chamber valve 172 fully closed in the first ignition mode and fully open in the second ignition mode. When pre-chamber valve 172 is fully closed, as shown in FIGS. 1 and 2A, pre-chamber 138 may be fluidically coupled to main combustion chamber 131 via one or more holes and/or grooves in valve seat 139 (e.g., flow passages) and may operate as an active pre-chamber. Thus, when pre-chamber valve 172 is closed, the cross-sectional flow area (and the degree of fluid communication) between pre-chamber 138 and main combustion chamber 131 is relatively low, as will be elaborated below with respect to FIG. 2A. When pre-chamber valve 172 is open, pre-chamber 138 and main combustion chamber 131 may be fluidically coupled via a passage formed at the open pre-chamber valve seat 139 in addition to the one or more holes and/or grooves in valve seat 139. The cross-sectional flow area of the passage formed at valve seat 139 (and the degree of fluid communication between pre-chamber 138 and main combustion chamber 131) is relatively high and may be large enough that pre-chamber 138 and main combustion chamber 131 together form a combined combustion chamber, as will be elaborated below with respect to FIG. 2B.

While operating in the first ignition mode (e.g., when pre-chamber valve 172 is closed and pre-chamber 138 operates as an active pre-chamber), air may be inducted into pre-chamber 138 during a compression stroke of the cylinder due to a pressure differential between the pre-chamber 138 and the main combustion chamber 131. For example, pressure may increase in the main combustion chamber during the compression stroke, while the pre-chamber remains at a lower pressure due to a flow restriction created by the grooves and/or holes fluidly coupling the pre-chamber and the main combustion chamber, such as due to a geometry of the holes and/or grooves. As a result, air may flow from the higher pressure main combustion chamber 131 to the lower pressure pre-chamber 138 via the grooves and/or holes in the pre-chamber valve seat 139. Fuel may be injected in the pre-chamber by pre-chamber fuel injector 96 in addition to fuel injected in the main cylinder by main chamber fuel injector 66. Thus, both air and fuel are delivered to pre-chamber 138 while operating in the first ignition mode, which may produce an air-fuel mixture with an air-fuel ratio (AFR) that may differ from an AFR in cylinder 130. In one example, the AFR in pre-chamber 138 may be richer (e.g., have a higher proportion of fuel) than the AFR in main combustion chamber 131. In another example, the AFR in the pre-chamber may be the same as the AFR in the main combustion chamber. In yet another example, the AFR in the pre-chamber 138 may be leaner (e.g., have a higher proportion of air) than the AFR in main combustion chamber 131.

In contrast, while operating in the second ignition mode (e.g., when the pre-chamber valve 172 is open, and when pre-chamber 138 and main combustion chamber 131 comprise a combined combustion chamber), air may be inducted into the combined combustion chamber during a compression stroke of the cylinder. For example, because the open pre-chamber valve 172 provides a large cross-sectional flow area between pre-chamber 138 and main combustion chamber 131, the inducted air may rapidly diffuse throughout the combined combustion chamber. Further, fuel may be injected in the combined combustion chamber by at least one of the pre-chamber fuel injector 96 and the main chamber fuel injector 66, which may also rapidly diffuse throughout both the pre-chamber 138 portion and the main combustion chamber 131 portion of the combined combustion chamber. For example, both pre-chamber fuel injector 96 and main chamber fuel injector 66 may inject fuel during the compression stroke. In another example, pre-chamber fuel injector 96 may inject fuel in the combined combustion chamber, while main chamber fuel injector 66 may not inject fuel in the combined combustion chamber. In yet another example, the main chamber fuel injector 66 may inject fuel in the combined combustion chamber, while pre-chamber fuel injector 96 may not injector fuel in the combined combustion chamber. Thus, both air and fuel are delivered to the combined combustion chamber, which may be operated at a single AFR while operating in the second ignition mode.

Fuel may be delivered to main chamber fuel injector 66 and pre-chamber fuel injector 96 from a high pressure fuel system 180 including one or more fuel tanks, fuel pumps, and a fuel rail. Alternatively, fuel may be delivered by a single stage fuel pump at a lower pressure. As one example, main chamber fuel injector 66 and pre-chamber fuel injector 96 may share a common high pressure fuel rail 190. For example, including the common high pressure fuel rail 190 may reduce a cost and complexity of the system, relative to systems with separate fuel rails for each fuel injector. As an example, common high pressure fuel rail 190 may include one fuel pump operated by a single actuator. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to main combustion chamber 131 and pre-chamber 138, which may produce a combustible air-fuel mixture.

Fuel may be delivered by main chamber fuel injector 66 and pre-chamber fuel injector 96 to cylinder 130 during a single cycle of the cylinder. Further, the distribution and/or relative amount of fuel delivered from main chamber fuel injector 66 and pre-chamber fuel injector 96 may vary with operating conditions. Furthermore, for a single combustion event, multiple injections of the delivered fuel may be performed per cycle. The multiple injections may be performed during the compression stroke, intake stroke, or any appropriate combination thereof. In some examples, one of pre-chamber fuel injector 96 and main chamber fuel injector 66 may not inject fuel during an engine cycle, while in other examples, both may inject fuel during an engine cycle, as will be described in more detail in FIG. 4. In particular, both pre-chamber fuel injector 96 and main chamber fuel injector 66 may inject fuel while operating in the first ignition mode (e.g., with pre-chamber ignition). In contrast, while operating in the second ignition mode, at least one of the fuel injectors may inject fuel into the combined combustion chamber.

An ignition system 88 may provide an ignition spark to spark plug 94 in response to a spark advance signal SA from controller 12, during select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event.

Further, based on a position of pre-chamber valve 172, ignition system 88 may initiate combustion in a first ignition mode or a second ignition mode. In the first ignition mode, during which pre-chamber valve 172 is closed, the air-fuel mixture within the pre-chamber may combust when spark plug 94 is actuated, the increased pressure of combustion sending jets of flame into main combustion chamber 131 via the holes and/or grooves in pre-chamber valve seat 139, for example. The plurality of holes and/or grooves may be arranged such that the jets of flame are evenly distributed in cylinder 130, as shown in FIGS. 3A-3C and described below. The jets of flame may ignite the air-fuel mixture in main combustion chamber 131, causing combustion. In the second ignition mode (e.g., during which pre-chamber valve 172 is open and pre-chamber 138 operates as part of a combined combustion chamber), spark plug 94 may directly provide an ignition spark to an air-fuel mixture in the combined combustion chamber. After combustion, a mixture of exhaust gases from both pre-chamber 138 and main combustion chamber 131 may be exhausted from cylinder 130 to exhaust manifold 48 via opening of exhaust valve 8.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. Further, the compression ratio of cylinder 130 may be increased or decreased via adjusting the position of pre-chamber valve 172. For example, when pre-chamber valve 172 is closed, the clearance volume when piston 136 is at top dead center (TDC) may be smaller relative to the clearance volume when pre-chamber valve 172 is open. In particular, when pre-chamber valve 172 is open, the clearance volume when piston 136 is at TDC may include the volume of pre-chamber 138, while the clearance volume when piston 136 is at TDC may not include the volume of pre-chamber 138 when pre-chamber valve 172 is closed. When the clearance volume of cylinder 130 when piston 136 is at TDC is larger (e.g., when pre-chamber valve 172 is open), the compression ratio may be smaller relative to the compression ration when the clearance volume of cylinder 130 when piston 136 is at TDC is smaller (e.g., when pre-chamber valve 172 is closed). Thus, adjusting the position of pre-chamber valve 172 may change the clearance volume, and thus the compression ratio, of cylinder 130.

Engine 10 may be controlled at least partially by controller 12 and by input from a vehicle operator 113 via an accelerator pedal 116 and accelerator pedal position sensor 118 and via a brake pedal 117 and brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 123, an engine coolant temperature signal (ECT) from a temperature sensor 112 coupled to coolant sleeve 114, signal EGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as main chamber fuel injector 66, pre-chamber fuel injector 96, pre-chamber valve 172, throttle 62, spark plug 94, the intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 4.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Next, FIGS. 2A and 2B show detailed views of pre-chamber 138 introduced in FIG. 1. As such, components previously introduced in FIG. 1 are numbered the same in FIGS. 2A and 2B and will not be reintroduced. Further, FIGS. 2A and 2B are substantially identical except for the position of pre-chamber valve 172 and will be described collectively. As shown in FIGS. 2A and 2B and elaborated above with respect to FIG. 1, cylinder 130 includes cylinder walls 132, with piston 136 positioned therein. Main combustion chamber 131 and piston 136 may be coaxial with a central axis 299. For example, central axis 299 may be parallel to cylinder walls 132, and may be orthogonal to a planar surface 223 of piston 136. Further still, piston 136 may include various piston crown geometries, which may alter the combustion properties of cylinder 130 by changing the volume and geometry of main combustion chamber 131 relative when the crown (e.g., top surface) of piston 136 is wholly planar. In the example shown in FIGS. 2A and 2B, the crown geometry of piston 136 includes a bowl 222. Note that the intake valve and exhaust valve (e.g., intake valve 4 and exhaust valve 8 of FIG. 1) are not shown in FIGS. 2A and 2B for illustrative clarity.

As shown in FIGS. 2A and 2B, pre-chamber valve seat may be coaxial with central axis 299 and parallel to planar surface 223. Further, pre-chamber 138 includes an internal cavity 224. A valve stem 276 of pre-chamber valve 172 may be positioned at least partially within internal cavity 224, while a valve head 274 of pre-chamber valve 172 may extend outside internal cavity 224 into main combustion chamber 131. Valve head 274 includes a tapered, substantially conical portion of pre-chamber valve 172 that extends from valve stem 276. A volume of internal cavity 224 may be significantly less than a volume of main combustion chamber 131. In some examples, a ratio of the volume of internal cavity 224 to the volume of main combustion chamber 131 may be 1:10, 1:12, or 1:8. In other examples, the ratio of the volume of internal cavity 224 to the volume of main combustion chamber 131 may be different.

Pre-chamber valve seat 139 may include a central opening configured to accommodate pre-chamber valve 172 in both a first, closed position 200 (shown in FIG. 2A) and a second, open position 205 (shown in FIG. 2B). For example, the central opening may be substantially conical and complementary to the shape of valve head 274. In some examples, such as the example shown, valve stem 276 may be positioned by a spring assembly 214, including a valve spring 212, a valve guide 220, and a retainer 218. In other examples, pre-chamber valve 172 may be electrically actu-ated or may be positioned by other actuation systems. For example, the actuation system may include an overhead cam shaft including a cam lobe that pushes open the pre-chamber valve 172 as it is rotated via the cam shaft. In such an actuation system, retention of closed position 200 (e.g., during a pre-chamber combustion event) may be achieved via mechanical cam locking, for example, so that the cam lobe does not rotate to push open pre-chamber valve 172. Retainer 218 may have a fixed position on the valve stem 276. Valve head 274 may be configured to be in direct contact with valve seat 139 when pre-chamber valve 172 is in the closed position 200 shown in FIG. 2A. For example, a seal may form between valve seat 139 and valve head 274 where valve seat 139 is in direct, face-sharing contact with valve head 274.

A rocker arm 210 may be in contact with valve stem 276. To adjust a position of pre-chamber valve 172, a solenoid 280 may be actuated to adjust a pressure of engine oil 208 in an oil chamber 204, which may in turn cause rocker arm 210 to pivot on a rocker arm shaft 216 to open or close pre-chamber valve 172. For example, solenoid 280 may control a flow and/or pressure of engine oil 208 received by oil chamber 204 from an engine oil passage. Further, in the example shown in FIGS. 2A and 2B, a position of an oil plunger 206 varies with the pressure of engine oil 208 in oil chamber 204. With respect to the orientation shown in FIGS. 2A and 2B, the vertical position of oil plunger 206 increases as the pressure of engine oil 208 in oil chamber 204 increases (e.g., until oil plunger 206 reaches a highest possible position, such as by reaching a mechanical end-stop). Oil plunger 206 is in direct contact with a first end of rocker arm 210, while a second end of rocker arm 210 is in direct contact with an end of valve stem 276 that is opposite valve head 274. As the vertical position of oil plunger 206 increases, it applies an upward force to the first end of rocker arm 210 that causes rocker arm 210 to pivot on rocker arm shaft 216, which in turn applies a downward force to valve stem 276 via the second end of rocker arm 210. For example, the increased vertical position of oil plunger 206 vertically raises the first end of rocker arm 210 and vertically lowers the second end of rocker arm 210. The downward force applied to valve stem 276 by the second end of rocker arm 210 may cause retainer 218 to compress valve spring 212, overcoming a spring force of valve spring 212 and causing pre-chamber valve 172 to open.

In one example, when the pressure of engine oil 208 is lower than a threshold pressure, oil plunger 206 may be in a first, lower position, such that rocker arm 210 is in a raised position and pre-chamber valve 172 is closed, as shown in FIG. 2A. For example, the force applied to rocker arm 210 by oil plunger 206, and thus to valve stem 276 by rocker arm 210, may be insufficient to overcome the spring force of valve spring 212 when the pressure is lower than the threshold pressure. Thus, the valve spring 212 may hold pre-chamber valve 172 closed when the pressure of engine oil 208 is less than the threshold pressure. Conversely, when solenoid 280 increases the pressure of engine oil 208 to be higher than the threshold pressure, oil plunger 206 may be in a second, higher position, such that rocker arm 210 pivots to a lowered position and opens pre-chamber valve 172, as shown in FIG. 2B. For example, the force applied to rocker arm 210 by oil plunger 206, and thus to valve stem 276 by rocker arm 210, may be greater than the opposing spring force of the valve spring 212 acting on retainer 218, lifting valve head 274 from valve seat 139.

Adjusting the position of pre-chamber valve 172 may include adjusting an amount of fluid communication between internal cavity 224 of pre-chamber 138 and main combustion chamber 131. In particular, adjusting the position of pre-chamber valve 172 changes a cross-sectional area of flow between internal cavity 224 and main combustion chamber 131. As an example, opening the valve may increase the cross-sectional area of flow between internal cavity 224 and main combustion chamber 131, while closing the valve may decrease the cross-sectional area of flow between internal cavity 224 and main combustion chamber 131. Thus, the cross-sectional area of flow between pre-chamber 138 and main combustion chamber 131 when the valve is fully closed (e.g., closed position 200 shown in FIG. 2A) may be a first, lower cross-sectional area, and the cross-sectional area of flow between the pre-chamber 138 and the main combustion chamber 131 when the valve is fully open (e.g., open position 205 shown in FIG. 2B) may be a second, higher cross-sectional area.

When pre-chamber valve 172 is closed and the flow between internal cavity 224 and main combustion chamber 131 has the first cross-sectional area (e.g., as shown in FIG. 2A), internal cavity 224 and main combustion chamber 131 may operate as separate combustion chambers due to a pressure differential between the two combustion chambers. For example, when pre-chamber valve 172 is closed and spark plug 94 is actuated, an ignition spark may directly ignite an air-fuel mixture in pre-chamber 138 and not in main combustion chamber 131. As the air-fuel mixture in pre-chamber combusts, jets of flame and hot gas may flow out of pre-chamber 138 via flow passages, such as holes and/or grooves in pre-chamber valve seat 139, and the jets of flame and hot gas may ignite an air-fuel mixture in main combustion chamber 131. An AFR in the pre-chamber may be measurably higher or lower, relative to an AFR in the main combustion chamber, in some examples.

Further, when pre-chamber valve 172 is open and the flow between internal cavity 224 and main combustion chamber 131 has the second cross-sectional area (e.g., as shown in FIG. 2B), a pressure differential between internal cavity 224 and main combustion chamber 131 may be sufficiently small so that internal cavity 224 and main combustion chamber 131 form a combined combustion chamber 240. Due to the small pressure differential between internal cavity 224 and main combustion chamber 131, fuel injected into each of pre-chamber 138 and main combustion chamber 131 may diffuse throughout combined combustion chamber 240, such that combined combustion chamber 240 has a more even distribution of fuel relative to a distribution of fuel between pre-chamber 138 and main combustion chamber 131 when pre-chamber valve 172 is closed. In particular, when pre-chamber valve 172 is open, an ignition spark provided by spark plug 94 in pre-chamber 138 may ignite an air-fuel mixture diffused throughout combined combustion chamber 240 in a single combustion event.

Next, FIGS. 3A-3C show example configurations of pre-chamber valve seat 139 introduced in FIGS. 1 and 2A-2B. Like components will be numbered the same and will not be reintroduced. As elaborated above, pre-chamber valve seat 139 includes flow passages, such as a plurality of holes and/or grooves, which may function as pre-chamber openings when the pre-chamber ignition system operates in the first ignition mode. Pre-chamber valve seat 139 is an annular surface with a thickness along axis 299. FIGS. 3A-3C each show a top view of valve seat 139 that is perpendicular to axis 299 of FIGS. 2A and 2B and parallel to planar surface 223 of FIGS. 2A and 2B.

FIG. 3A shows a first example configuration 301 of pre-chamber valve seat 139, including a plurality of holes 302. The example pre-chamber valve seat shown in FIG. 3A includes six holes, however, the number, size, and position of the holes may be modified without departing from the scope of the present disclosure. Holes 302 are unobstructed when valve 172 (not shown in FIG. 3A) is closed, allowing gases to flow between pre-chamber 138 and main combustion chamber 131 via holes 302. As such, holes 302 function as flow passages when valve 172 is closed. The sum of the cross-sectional area of each of the plurality of holes 302 may be equivalent to the first cross-sectional area of flow between internal cavity 224 and main combustion chamber 131, described above with respect to FIG. 2A.

FIG. 3B shows a second example configuration 303 of pre-chamber valve seat 3B, including a plurality of grooves 304. The example pre-chamber valve seat shown in FIG. 3B includes five grooves, however, the number, size and position of the grooves may be modified without departing from the scope of the present disclosure. Similar to the plurality of holes 302, the plurality of grooves 304 are unobstructed when valve 172 is closed, such that the grooves 304 each form a channel through which gases may flow between pre-chamber 138 and main combustion chamber 131. As such, grooves 304 function as flow passages when valve 172 is closed. As an example, including a plurality of grooves, rather than a plurality of holes, in pre-chamber valve seat 139 may alter a speed and direction of jets of flame and hot gas exiting the pre-chamber after combustion in the pre-chamber. The sum of the cross-sectional area of each of the plurality of grooves 304 is equivalent to the first cross-sectional area of flow between the internal cavity 224 and main combustion chamber 131, described above with respect to FIG. 2A.

Further, FIG. 3C shows a third example configuration 305 of pre-chamber valve seat 139, including the plurality of holes 302 and the plurality of grooves 304. Holes 302 and grooves 304 are unobstructed when valve 172 is closed, and function as flow passages. The number and position of the plurality of holes and the plurality of grooves may be modified without departing from the scope of the present disclosure. Further, including both a plurality of holes and a plurality and grooves may modify the characteristics of the pre-chamber system by modifying speed and a direction of jets of flame and hot gas exiting the pre-chamber after combustion in the pre-chamber. The sum of the cross-sectional area of each of the plurality of grooves 304 and each of the plurality of holes 302 is equivalent to the first cross-sectional area of flow between internal cavity 224 and main combustion chamber 131, described above with respect to FIG. 2A.

Figure 4:
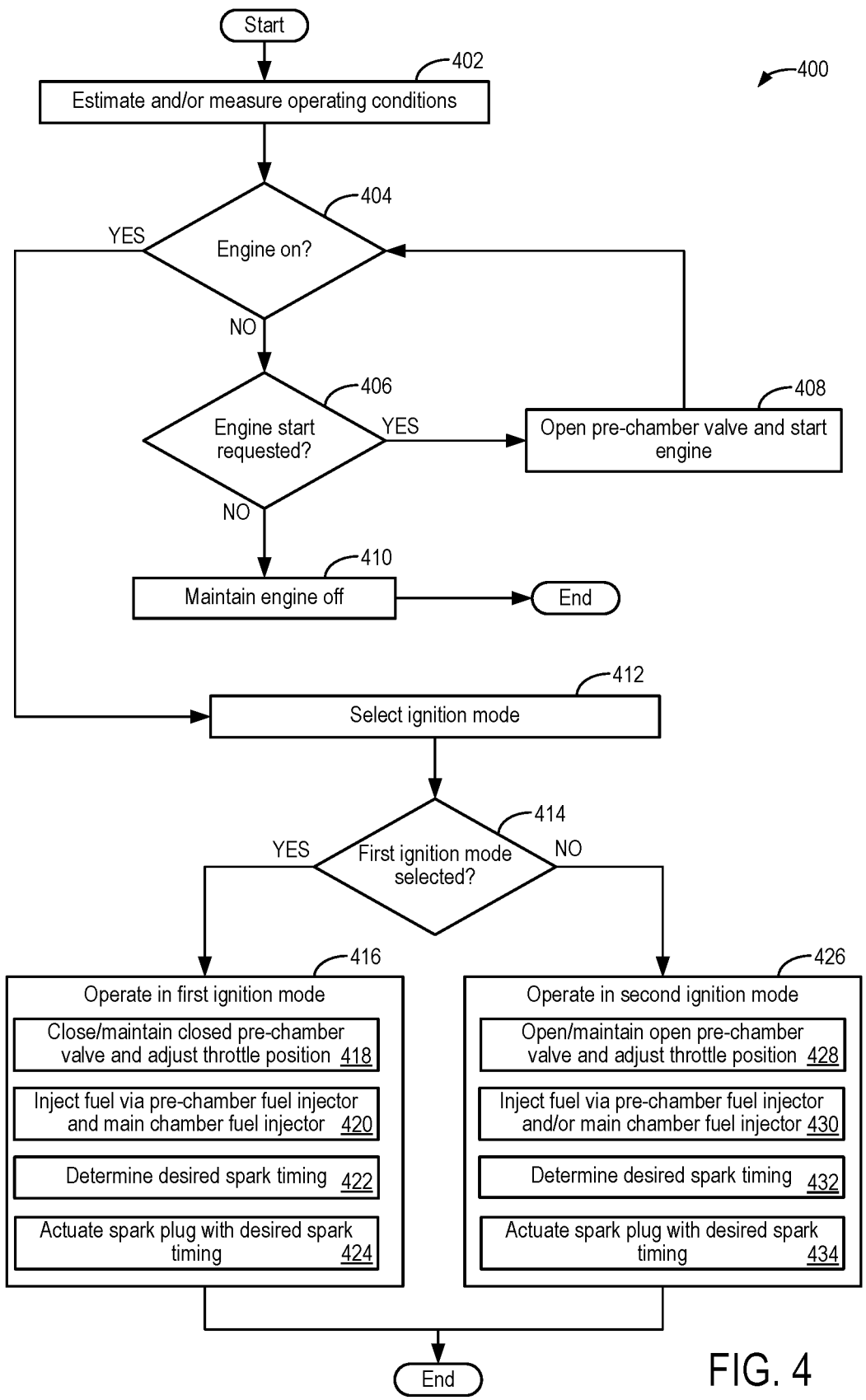
FIG. 4 shows an example method for operating an engine having a pre-chamber in different ignition modes based on operating conditions.

Next, FIG. 4 shows an example method 400 for operating a cylinder having a pre-chamber. As one example, the cylinder may transition between a first ignition mode and a second ignition mode by adjusting a position of a pre-chamber valve (e.g., pre-chamber valve 172 of FIGS. 1-2B), the first ignition mode calibrated for pre-chamber ignition and the second ignition mode calibrated for spark ignition in a combined combustion chamber. Method 400 will be described with respect to the cylinder configuration and pre-chamber configuration shown in FIGS. 1-2B, although method 400 may be applied in other systems that include a pre-chamber. Instructions for carrying out method 400 and the rest of the methods included herein may be executed by a controller, such as controller 12 of FIG. 1, based on instructions stored on a memory of the controller and in conjunction with signals received from sensors of the engine system, such as the sensors described above with reference to FIG. 1, examples of which will be mentioned below. The controller may employ engine actuators of the engine system (e.g., pre-chamber fuel injector 96, main chamber fuel injector 66, and spark plug 94 of FIG. 1) to adjust engine operation according to the methods described below. Method 400 will be described with respect to a single cylinder including a pre-chamber, although method 400 may be performed simultaneously for a plurality of cylinders in a multi-cylinder engine.

At 402, method 400 includes estimating and/or measuring operating conditions. The operating conditions may include, for example, vehicle speed, engine speed, engine load, cylinder AFR, exhaust gas AFR, engine temperature, an accelerator pedal position, a brake pedal position, a throttle position, and exhaust gas temperature. The operating conditions may be measured by one or more sensors communicatively coupled to the controller or may be inferred based on available data. For example, the controller may estimate the engine load by inputting a throttle position and a mass air flow (MAF) sensor reading into one or more look-up tables, maps, or functions, which may output engine load. As another example, the exhaust gas temperature may be measured by an exhaust gas temperature sensor, such as exhaust gas temperature sensor 158 of FIG. 1. As yet another example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque. As another example, the throttle position may be measured by a throttle position sensor (TP), such as the throttle position sensor coupled to throttle 62 of FIG. 1. The engine speed (RPM) may be determined by a crankshaft position sensor (e.g., Hall effect sensor 120 of FIG. 1).

At 404, method 400 includes determining whether the engine is on. In some examples, the controller may determine whether the engine is on based in part on status of an ignition system (e.g., ignition system 88 of FIG. 1). For example, when the ignition system is on, the controller may determine that the engine is on. As another example, when the ignition system is off, the controller may determine that the engine is off. In other examples, the controller may determine whether the engine is on based on a setting stored in controller memory. In yet other examples, the controller may determine whether the engine is on based in part on the engine speed. For example, when the engine speed is zero and combustion is not occurring in the engine (e.g., the engine is unfueled), the controller may determine that the engine is off. As another example, the controller may determine that the engine is on when the engine is operating at a non-zero speed and combustion is occurring in the engine (e.g., the engine is fueled).

If the controller determines that the engine is not on at 404 (e.g., the engine is off), method 400 proceeds to 406 and includes determining whether an engine start is requested. In some examples, the controller may determine whether an engine start is requested based on a position of an ignition key. For example, when the ignition key is in an "off" position, the controller may determine that an engine start is not requested. However, when the ignition key is in an "on" position, the controller may determine that an engine start is requested. In other examples, the controller may determine whether engine start is requested based on a setting stored in controller memory.

If the controller determines that an engine start is requested at 406 (e.g., responsive to an engine start request), method 400 proceeds to 408 and includes opening the pre-chamber valve and starting the engine. In some examples, the controller may open the pre-chamber valve by adjusting a position of a rocker arm coupled to the pre-chamber valve (e.g., rocker arm 210 of FIGS. 2A and 2B). For example, the controller may generate a control signal that causes an actuator (e.g., solenoid 280 of FIGS. 2A and 2B) to adjust a position of the rocker arm to open the pre-chamber valve. As one example, the actuator may adjust a pressure of oil in a chamber coupled to an oil plunger, the oil plunger controlling the position of the rocker arm, as elaborated in FIGS. 2A and 2B. However, other actuation systems also may be used to adjust the pre-chamber valve between a closed state and an open state. Opening the pre-chamber valve may reduce a compression ratio of the cylinder (e.g., by increasing a clearance volume of the cylinder), which may decrease an amount of torsional work while starting the engine. Therefore, after opening the pre-chamber valve, the controller may crank the engine by sending an actuation signal to a motor coupled to the crankshaft of the engine (e.g., such as electric machine 161 of FIG. 1). For example, the controller may adjust a timing and a pulse-width of a control signal to the motor based on the request to crank the engine. As one example, as a desired motor torque and/or motor speed increases, a duty cycle of the control signal may increase. The actuation signal may cause the starter motor to apply torque to the crankshaft, causing the crankshaft to rotate and increase the engine to a non-zero speed for starting the engine and commencing combustion. Method 400 may then return to 404.

If the controller determines that an engine start is not requested at 406, method 400 proceeds to 410 and includes maintaining the engine off. For example, maintaining the engine off may include not cranking the engine and not initiating combustion. As a result, the engine may remain off. After 410, method 400 may end.

Returning to 404, if the controller determines the engine is on, method 400 proceeds to 412 and includes selecting an ignition mode. That is, the controller may select one of the first ignition mode and the second ignition mode based on the operating conditions. In some examples, the controller may select between the first ignition mode and the second ignition mode based on an engine temperature. For example, if the engine temperature is below a threshold engine temperature for operating in the first ignition mode, the controller may determine to operate in the second ignition mode. The threshold engine temperature may be defined as a temperature below which combustion in the pre-chamber is unpredictable due to low fuel vaporization. As an example, during a cold start condition, the engine temperature may be below the threshold engine temperature for operating in the first ignition mode, and the controller may determine that operating in the first ignition mode is not indicated (e.g., the second ignition mode is indicated). As another example, additionally or alternatively, the controller may select the first ignition mode when the engine load exceeds a threshold engine load. The threshold engine load may be a pre-determined, non-zero number stored in controller memory that corresponds to a calibrated engine load above which pre-chamber ignition offers increased performance characteristics relative to spark ignition, for example. In other examples, the controller may adjust the threshold engine load for operating in the first ignition mode by inputting the engine operating conditions (e.g., exhaust gas temperature, engine speed, throttle position, AFR) into one or more look-up tables, maps, or functions, which may output the adjusted threshold engine load for operating in the first ignition mode.

In some examples, the controller may select the first ignition mode only when both conditions (e.g., the engine temperature above the threshold engine temperature and the engine load above the threshold engine load) are met. As an example, the first ignition mode may not be selected (and the second ignition mode may be selected) when the engine temperature is less than the threshold engine temperature, even if the engine load is greater than the threshold engine load. Conversely, when the engine temperature is above the threshold engine temperature and the engine load is greater than the threshold engine load, the first ignition mode may be selected. In some examples, additional conditions may be used by the controller to select between the first ignition mode and the second ignition mode.

At 414, method 400 includes determining whether the first ignition mode is selected (e.g., at 412). If the controller determines that the first ignition mode is selected, method 400 proceeds to 416 and includes operating in the first ignition mode. Operating in the first ignition mode includes closing/maintaining closed the pre-chamber valve and adjusting the throttle position, as indicated at 418. For example, if the engine was previously operating in the second ignition mode (e.g., the pre-chamber valve was open), the controller may close (e.g., fully close) the pre-chamber valve from the open position. For example, the controller may close the pre-chamber valve by adjusting the pulse-width of an actuation signal to the solenoid controlling the rocker arm coupled to the pre-chamber valve to decrease the oil pressure. In other examples, when the pre-chamber valve is already closed, method 400 includes maintaining closed the valve at 418. Maintaining the valve closed may include maintaining a pressure of engine oil in an oil chamber (e.g., engine oil 208 in oil chamber 204 of FIGS. 2A and 2B) below a threshold oil pressure for opening the pre-chamber valve, as described above with respect to FIGS. 2A and 2B. By maintaining the pressure of engine oil in the oil chamber below the threshold oil pressure, the rocker arm may not overcome a spring force of a valve spring (e.g., valve spring 212 of FIGS. 2A and 2B), thus holding the pre-chamber valve in the closed position shown in FIG. 2A.

Further, the controller may adjust the position of the throttle for the first ignition mode. As an example, the throttle may be adjusted using different calibrations in the first ignition mode and the second ignition mode to account for a difference between a compression ratio of the cylinder while operating in the first ignition mode and a compression ratio of the cylinder while operating in the second ignition mode. For example, the controller may input the accelerator pedal position and a current throttle position (e.g., as measured by the throttle position sensor) into one or more look-up tables, maps, or functions that are calibrated for the first ignition mode, which may output a desired throttle adjustment amount for operating in the first ignition mode. For example, the controller may decrease an opening of the throttle via an actuator controlling the throttle position when transitioning from second ignition mode to the first ignition mode in order to compensate for the higher compression ratio of the first ignition mode. As one example, the throttle may be further closed while operating in the first ignition mode than while operating in the second ignition mode for a same accelerator pedal position. In other examples, when the throttle is already adjusted for the first ignition mode, the throttle position may be maintained and/or adjusted using the calibration for the first ignition mode as operating conditions, such as the accelerator pedal position, change.

Operating in the first ignition mode further includes injecting fuel via the pre-chamber fuel injector and the main chamber fuel injector, as indicated at 420. Injecting fuel via the pre-chamber fuel injector and the main chamber fuel injector at 420 may include determining a desired pre-chamber air-fuel ratio (AFR) and a desired main combustion chamber AFR. The AFR is a ratio of the amount of air to an amount of fuel injected into a combustion chamber. The desired AFR of the main combustion chamber may be determined based on the engine operating conditions, such as engine load, engine speed, and a position of the throttle, such that combustion of an air-fuel mixture in the main combustion chamber produces torque while minimizing emissions, as an example. For example, the controller may input engine operating conditions, including the engine load, the engine speed, and fuel composition, into one or more look-up tables, functions, and maps, which may output the desired AFR of the main combustion chamber. As an example, the desired AFR of the main combustion chamber may be stoichiometry. As another example, the desired AFR of the main combustion chamber may be lean relative to stoichiometry. Further, the desired AFR of the pre-chamber may be determined by the controller based on the desired AFR of the main combustion chamber, such that combustion of an air-fuel mixture in the pre-chamber ignites an air-fuel mixture in the cylinder while minimizing emissions, as an example. For example, the controller may input the desired AFR of the main combustion chamber and the current engine operating conditions, such as the engine temperature and the fuel composition, into one or more look-up tables, function, and maps, which may output the desired pre-chamber AFR to achieve combustion. As an example, the desired AFR of the pre-chamber may be stoichiometry. As another example, the desired AFR of the pre-chamber may be richer than stoichiometry when fuels with higher evaporation temperatures, such as E85, are used in order to account for evaporated fuel that participates in the combustion and non-evaporated fuel that does not participate in combustion to achieve a substantially stoichiometry combustion with the evaporated fuel. As yet another example, the desired AFR of the pre-chamber may be adjusted from stoichiometry when an operating AFR of the cylinder is adjusted from stoichiometry such that when the combustion gases from the cylinder and the pre-chamber are combined, the combined gases have an AFR approximately equal to stoichiometry.

Injecting fuel via the pre-chamber fuel injector and the main combustion chamber fuel injector at 420 may further include injecting fuel into the pre-chamber by adjusting an amount of fuel injected into the pre-chamber based on the desired AFR of the pre-chamber, as determined above. For example, the controller may input the desired pre-chamber AFR into one or more look-up tables, functions, and maps, which may output a desired fuel amount to inject that will achieve the desired AFR in the pre-chamber. In one example, the controller may inject the desired fuel amount by adjusting the pulse-width of an actuation signal sent to the pre-chamber fuel injector, such as FPW2 shown in FIG. 1. The injected fuel may mix with air inducted into the pre-chamber to form an air-fuel mixture. Further, injecting fuel via the pre-chamber fuel injector and the main combustion chamber fuel injector may include injecting fuel into the main combustion chamber based on the desired main combustion chamber AFR, as determined above. For example, the controller may input a desired main combustion chamber AFR and an estimated amount of air inducted into the main combustion chamber into one or more look-up tables, functions, or maps, which may output a desired fuel amount to inject that will achieve the desired AFR in the main combustion chamber. Further, the injection pressure and timing may be determined to increase a burn rate and/or an ignitibility of the air-fuel mixture in the main combustion chamber. For example, the controller may input the desired main combustion chamber AFR and engine operating conditions such as engine load into one or more look-up tables, functions, and maps, which may output a desired fuel amount to inject that will achieve desired combustion qualities the pre-chamber. In one example, the controller may inject the desired fuel amount by adjusting a pulse-width of an actuation signal sent to the main combustion chamber fuel injector, such as FPW1 shown in FIG. 1. In some examples, the determined amount of fuel may be injected in a single injection event, while in other examples, the determined amount of fuel may be distributed over a plurality of injection events. The injected fuel may mix with air inducted to the main combustion chamber during the intake stroke to form an air-fuel mixture. Operating in the first ignition mode further includes determining a desired spark timing, as indicated at 422. Determining the desired spark timing may include determining when to ignite the air-fuel mixture in the pre-chamber relative to a position of a piston of the cylinder. The desired spark timing may be shifted relative to MBT based on engine operating conditions in order to achieve a desired pre-chamber ignition timing, and thus, a desired cylinder ignition timing. For example, the desired spark timing may be retarded relative to MBT timing to increase an exhaust gas temperature, while the desired spark timing may be advanced closer to MBT timing to increase a torque output of the cylinder. In one example, the controller may input one or more engine operating conditions (e.g., engine speed, engine load, the exhaust gas temperature, desired pre-chamber AFR, and cylinder AFR) and the ignition mode (e.g., the first ignition mode) into one or more look-up tables, functions, or maps to determine the desired spark timing for the pre-chamber ignition event. In another example, the controller may make a logical determination (e.g., regarding the desired spark timing) based on logic rules that are a function of the one or more engine operating conditions and the ignition mode.

Operating in the first ignition mode further includes actuating the spark plug with the desired spark timing, as indicated at 424. For example, the controller may generate a control signal (e.g., signal SA) that is sent to the ignition system to actuate the multi-gap igniter at the desired spark timing determined at 416. Actuating the spark plug at the desired spark timing may generate a spark in the pre-chamber. Generating the spark in the pre-chamber may cause the air-fuel mixture in the pre-chamber to combust, sending jets of hot gas and flame into the cylinder via pre-chamber orifices (e.g., grooves and/or holes in pre-chamber valve seat 139). When the main combustion chamber also includes a combustible air-fuel mixture (e.g., when the cylinder is fueled), the jets of hot gas and flame ignite the air-fuel mixture in the cylinder. Method 400 may then end.

Returning to 414, if the controller determines that the first ignition mode is not selected (e.g., the second ignition mode was selected at 412), method 400 proceeds to 426 and includes operating in the second ignition mode. Operating in the second ignition mode includes opening/maintaining open the pre-chamber valve and adjusting the throttle for the second ignition mode, as indicated at 428. For example, if the engine was previously operating in the first ignition mode (e.g., the pre-chamber valve was fully closed), the controller may open the pre-chamber valve from the closed position. For example, the controller may open the pre-chamber valve by adjusting the pulse-width of the actuation signal to the solenoid controlling the pressure of the engine oil in the oil chamber to increase the oil pressure. In other examples, when the pre-chamber valve is already open, method 400 may include maintaining open the pre-chamber valve. Maintaining the valve open may include maintaining the pressure of the engine oil in the oil chamber above the threshold oil pressure so that the rocker arm overcomes the spring force of the valve spring and holds the valve open, as elaborated above with particular respect to FIG. 2B.

Further, the controller may adjust a position of a throttle plate of the throttle using calibrations for the second ignition mode. For example, the controller may input the accelerator pedal position and the currently measured throttle position into one or more look-up tables, maps, and functions that are calibrated for operating in the second ignition mode, which may output a desired throttle plate position adjustment. The controller may further adjust an actuation signal to the actuator controlling the throttle position based on the desired throttle plate position adjustment. As one example, when transitioning from the first ignition mode to the second ignition mode, the throttle may be further opened to compensate for the decreased compression ratio of the second ignition mode. As another example, the throttle may be in a further open position when operating in the second ignition mode relative to the first ignition mode for a same accelerator pedal position.

Operating in the second ignition mode further includes injecting fuel via the pre-chamber fuel injector and/or the main chamber fuel injector, as indicated at 430. Injecting fuel via the pre-chamber fuel injector and the main chamber fuel injector at 430 may include determining the desired combined combustion chamber AFR. For example, the controller may input engine operating conditions, including the engine load, the engine speed, and the fuel composition, into one or more look-up tables, functions, and maps, which may output the desired AFR of the combined combustion chamber. As an example, the desired AFR of the combined combustion chamber may be stoichiometry. As another example, the desired AFR of the combined combustion chamber may be rich or lean relative to stoichiometry.

Injecting fuel via the pre-chamber fuel injector and/or the main combustion chamber fuel injector at 430 may further include injecting fuel into the combined combustion chamber by adjusting an amount of fuel injected into the combined combustion chamber based on the desired AFR of the combined combustion chamber. For example, the controller may input the desired combined combustion chamber AFR into one or more look-up tables, functions, and maps, which may output a desired fuel amount to inject that will achieve the desired AFR in the combined combustion chamber. In one example, the controller may inject the desired fuel amount by adjusting the pulse-width of the actuation signal sent to one or both of the pre-chamber fuel injector and the main chamber fuel injector. For example, fuel injection in the combined combustion chamber may occur during the compression stroke during the second ignition mode, which may increase ignitibility relative to fuel injection during the intake stroke (e.g., during the first ignition mode). In this way, and air-fuel mixture may be provided to the combined combustion chamber.

In some examples, injector targeting may be used to improve fuel injection while operating in the first ignition mode. For example, the pre-chamber injector may include one spray orifice because of the reduced spray volume for the pre-chamber, and that single spray orifice may be targeted to maximize spray atomization with minimal wall wetting. Further, the main chamber injector may include multiple spray orifices in order to provide a homogenous spray, while also including one spray orifice directed to spray through the open pre-chamber valve as needed to optimize the ignitable mixture in pre-chamber.

Operating in the second ignition mode further includes determining the desired spark timing, as indicated at 432. For example, the desired spark timing may be shifted relative to MBT based on engine operating conditions in order to achieve a desired cylinder ignition timing, as elaborated above with respect to 422. In some examples, the desired spark timing for operating in the second ignition mode may be advanced or retarded relative to the first ignition mode.

Operating in the second ignition mode further includes actuating the spark plug with the desired spark timing, as indicated at 434. For example, the desired spark timing may be the desired spark timing for the second ignition mode. For example, the controller may generate a control signal (e.g., signal SA) that is sent to the ignition system to actuate the spark plug at the desired spark timing determined at 432. Actuating the spark plug at the desired spark timing may generate a spark in the pre-chamber. Due to the engine operating conditions and the position of the pre-chamber valve, providing a spark in the pre-chamber may ignite an air-fuel mixture in the combined combustion chamber. Thus, while operating in the second ignition mode, the spark from the spark plug may directly ignite an air-fuel mixture in the combined combustion chamber (instead of the spark igniting a pre-chamber combustion event), referred to herein as direct spark ignition. For example, the second ignition mode includes directly igniting the air-fuel mixture in the combined combustion chamber via the ignition spark from the spark plug (e.g., spark ignition). In contrast, the first ignition mode includes directly igniting the air-fuel mixture in the pre-chamber via the ignition spark from the spark plug, which produces jets of flame and/or hot gas that in turn ignite the air-fuel mixture in the main combustion chamber (e.g., pre-chamber ignition). Although pre-chamber ignition in the first ignition mode may offer performance increases during certain engine operating conditions, direct spark ignition in the second ignition mode may offer increased combustion stability at some engine operating conditions, such as low load and cold start conditions. Method 400 may then end.

In this way, cylinder operating parameters, including a position of a pre-chamber valve, may be adjusted to transition between operating each cylinder of the engine with a pre-chamber in a first ignition mode and a second ignition mode, the first ignition mode providing pre-chamber ignition and the second ignition mode providing an ignition spark in a combined combustion chamber. For example, a controller may select the first ignition mode responsive to higher engine temperatures and engine loads and, in response to selecting the first ignition mode, may operate each cylinder with the pre-chamber valve in a closed position that maintains the pre-chamber and a main combustion chamber as separate but fluidly connected chambers. As another example, the controller may select the second ignition mode responsive to lower engine temperatures and engine loads and, in response to selecting the second ignition mode, may operate each cylinder with the pre-chamber valve in an open position that forms the combined combustion chamber with the pre-chamber and the main chamber.

Further, the controller may adjust cylinder operating parameters (e.g., fuel injection timing, fuel injection amount, and throttle position) for pre-chamber ignition responsive to selecting and operating in the first ignition mode and adjust the cylinder operating parameters for spark ignition in the combined main combustion chamber responsive to selecting and operating in the second ignition mode.

Further, instructions stored in memory may include instructions for determining conditions for operating in the first ignition mode from measurements made by one or more of an engine temperature sensor, a MAF sensor, a MAP sensor, and a throttle position sensor, and in response, closing or maintaining closed the pre-chamber valve by instructions for sending a signal to a solenoid configured to position the pre-chamber valve, and determining conditions for operating in the second ignition mode from the measurements made by one or more of the engine temperature sensor, the MAF sensor, the MAP sensor, and the throttle position sensor, and in response, opening or maintaining open the pre-chamber valve by instructions for sending a different signal to the solenoid. In some examples, the method may include determining whether to perform closing/maintaining closed the pre-chamber valve or opening/maintaining open the pre-chamber valve based on a determination of whether the conditions for operating in the first ignition mode are present and a determination of whether the conditions for operating in the second ignition mode are present. Further, the engine may be operated in one of the first ignition mode and the second ignition mode throughout all operating conditions of the engine, at least in some examples. By transitioning each cylinder between the first ignition mode and the second ignition mode based on the engine load and the engine temperature, a combustion stability and an efficiency of the cylinder may be increased.

Turning now to FIG. 5, an exemplary timing chart 500 of a cylinder operating in the first ignition mode is shown. The cylinder may be cylinder 130 of engine 10 in FIG. 1, for example, and may include a pre-chamber, such as the pre-chamber described in FIGS. 1-2B. In particular, FIG. 5 shows a timing chart for operating a cylinder with a pre-chamber when a pre-chamber valve is in a closed position, as shown in FIG. 2A, which maintains the pre-chamber as a separate chamber from a main combustion chamber of the cylinder. Timing chart 500 shows one combustion cycle, wherein the combustion cycle (e.g., a cylinder cycle) refers to four strokes of an engine cycle within the cylinder. A piston position relative to top dead center (TDC), bottom dead center (BDC), and the four strokes of the combustion cycle (intake, compression, power, and exhaust) is shown in plot 502. Further, a position of the pre-chamber valve is shown in plot 504, a pre-chamber fuel injection signal is shown in plot 506, a main chamber fuel injection signal is shown in plot 508, and a spark plug actuation signal is shown in plot 510. For all of the above, the horizontal axis represents engine position (e.g., in crank angle degrees), with the crank angle degrees (CAD) increasing from left to right. The vertical axis represents each labeled parameter. For plot 502, the vertical axis shows the piston position relative to TDC. For plot 504, the vertical axis the position of the pre-chamber valve as closed (e.g., fully closed) or open (e.g., fully open). For each of plots 506, 508, and 510, an increase in a magnitude of the parameter above zero indicates actuation of the corresponding injector or spark plug. Further, the stroke of the combustion cycle is indicated at the top of timing chart 500, the intake stroke corresponding to the interval from 0 CAD to 180 CAD, the compression stroke corresponding to the interval from 180 CAD to 360

CAD, the power stroke corresponding to the interval from 360 CAD to 540 CAD, and the exhaust stroke corresponding to the interval from 540 CAD to 720 CAD.

During the intake stroke between 0 CAD and 180 CAD, the piston moves to the bottom of the cylinder (plot 502) so as to increase the volume within the cylinder, and air is inducted into the cylinder via an open intake valve as the piston moves toward BDC (when the piston is at its bottommost position in the cylinder and the combustion chamber is at its largest volume). About halfway through the intake stroke at CAD1 (e.g., around 70 CAD), fuel is introduced into the cylinder (plot 508) via a cylinder fuel injector (e.g., cylinder fuel injector 66 of FIG. 1), forming an air-fuel mixture with the air inducted into the cylinder via the one or more intake ports. By injecting fuel during the intake stroke, mixing of an air-fuel mixture in the cylinder may be increased relative to injecting air during the compression stroke.

Next, just after the beginning of the compression stroke, the intake valve closes (not shown), effectively sealing the cylinder. During the compression stroke, the piston moves toward the cylinder head (plot 502) so as to compress the air within the cylinder. Further, an amount of air may be inducted into the pre-chamber from the main combustion chamber due to a pressure differential between the main combustion chamber and the pre-chamber. During the compression stroke, as the piston moves toward TDC (e.g., when the combustion chamber is at its smallest volume), pressure in the cylinder increases, which forces an amount of the air-fuel mixture into the pre-chamber (e.g., pre-chamber 138 of FIG. 1). Further, at CAD2 (e.g., around 230 CAD) additional fuel is introduced into the pre-chamber (plot 506) via a pre-chamber fuel injector (e.g., pre-chamber fuel injector 96 of FIG. 1). Fuel injected by the pre-chamber fuel injector during the compression stroke may mix with air and fuel in the pre-chamber.

The air-fuel mixture in the pre-chamber is ignited via actuating the spark plug (plot 510) shortly before TDC of the compression stroke at CAD3 (e.g., around 350 CAD). As the air-fuel mixture in the pre-chamber combusts, jets of flame and hot air flow from the pre-chamber to the cylinder via grooves/holes in a valve seat of the pre-chamber (e.g., such as adjustable valve seat 139 shown in FIGS. 3A-3C), and the jets of flame and hot air ignite the air-fuel mixture in the cylinder. A faster burn rate produced via the jets of flame and hot air enables the relatively late (e.g., close to TDC) spark timing used while operating in the first ignition mode. The rapid combustion of the air-fuel mixture in the cylinder during the power stroke (e.g., between 360 CAD and 540 CAD) pushes the piston back down to BDC (plot 502) to efficiently produce torque.

Turning now to FIG. 6, an exemplary timing chart 600 of a cylinder operating in the second ignition mode is shown. The cylinder may be cylinder 130 of engine 10 in FIG. 1, for example, and may include a pre-chamber, such as the adjustable spark plug described in FIGS. 1-2B. In particular, FIG. 6 shows a timing chart for operating a cylinder with a pre-chamber while a pre-chamber valve is in an open position, as shown in FIG. 2B, such that a main combustion chamber and a pre-chamber form a combined combustion chamber. As introduced above for timing chart 500 of FIG. 5, timing chart 600 shows one combustion cycle. Thus, timing chart 600 is similar to timing chart 500 of FIG. 5 except for the differences highlighted below. A piston position relative to TDC, BDC, and the four strokes of the combustion cycle is shown in plot 602. Further, a pre-chamber valve opening is shown in plot 604, pre-chamber fuel injection signal is shown in plot 606, a main chamber fuel injection signal is shown in plot 608, and a spark actuation signal is shown in plot 610. Further, plots for like quantities from FIG. 5 (e.g., while operating in the first ignition mode) are shown as dashed plots for reference. For all of the above, the horizontal axis represents engine position (e.g., in crank angle degrees), with the crank angle degrees increasing from left to right. The vertical axis represents each labeled parameters. For plot 602, the vertical axis shows the piston position relative to TDC. For plot 604, the vertical axis the position of the pre-chamber valve as closed (e.g., fully closed) or open (e.g., fully open). For each of plots 606, 608, and 610, an increase in a magnitude of the parameter above zero indicates actuation of the corresponding injector or spark plug. Further, the stroke of the combustion cycle is indicated at the top of timing chart 600, as elaborated above with respect to FIG. 5.

During the intake stroke, the piston position moves to the bottom of the cylinder (plot 602) so as to increase the volume within the cylinder, and air is inducted into the cylinder via an open intake valve as the piston moves toward BDC. During the compression stroke (e.g., between 180 CAD and 360 CAD), the piston moves toward the cylinder head (plot 602) so as to compress the air within the cylinder. During the compression stroke at CAD1 (e.g., around 270 CAD), fuel is introduced into the combined combustion chamber (plot 608) via a main chamber fuel injector (e.g., main chamber fuel injector 66 of FIG. 1), forming an air-fuel mixture with the air inducted into the cylinder. Thus, fuel injection while operating in the second ignition mode (plot 608) may be retarded (e.g., occurs closer to TDC of the compression stroke) relative to fuel injection while operating in the first ignition mode (dashed plot 508). Compression stroke injection (e.g., injecting fuel during the compression stroke, as performed in the second ignition mode) may increase the concentration of fuel near the spark plug relative to injection during the intake stroke. Further, at CAD2, which may occur after CAD1, additional fuel may be introduced into the combined combustion chamber (e.g., a volume including the main combustion chamber and the pre-chamber) via a pre-chamber fuel injector (e.g., pre-chamber fuel injector 96 of FIG. 1), altering an AFR of the combined combustion chamber (plot 606). Thus, pre-chamber fuel injection while operating in the second ignition mode (plot 606) may be retarded relative to fuel injection while operating in the first ignition mode (dashed plot 508), and the amount of fuel injected may be less relative to the amount injected in the first ignition mode.

The air-fuel mixture in the combined combustion chamber is ignited via actuating the spark plug (plot 610), resulting in combustion in the combined combustion chamber. For example, the spark plug may be actuated before TDC of the compression stroke at CAD3 (e.g., around 330 CAD). Specifically, while operating in the second ignition mode, spark timing may occur earlier in the compression stroke (plot 610) relative to spark timing while operating in the first ignition mode (dashed plot 510). Earlier spark timing is used while operating in the second ignition mode (e.g., relative to the first ignition mode) due to the slower burn rate of traditional spark ignition (e.g., relative to jet ignition) and may increase combustion stability while operating with spark ignition in the combined combustion chamber. As a result, during the power stroke (e.g., between 360 CAD and 540 CAD), combustion in the combined combustion chamber occurs, the expanding combustion gases in the cylinder pushing the piston back down to BDC (plot 602) to produce torque. In some examples, additional duration may be added to spark events in the second ignition mode, in order to increase a burn time while operating in the second ignition mode.

Turning now to FIG. 7, a prophetic example timeline for transitioning a multi-cylinder engine between a first ignition mode and a second ignition mode is shown. The engine may be engine 10 in FIG. 1, including cylinder 130 and pre-chamber 138, for example. An indication of whether the engine is operating in the second ignition mode or the first ignition mode is shown in plot 702, a pre-chamber valve position is shown in plot 704 (e.g., for each pre-chamber valve of the engine), an engine temperature is shown in plot 706, and an engine load is shown by plot 708. Further, a threshold engine temperature for operating in the first ignition mode is shown by dashed line 710, and a threshold engine load for operating in the first ignition mode is shown by dashed line 712. For all of the above, the horizontal axis represents time, with time increasing along the horizontal axis from left to right. The vertical axis represents each labeled parameter. For each of plots 706, and 708, a magnitude of the parameter increases up the vertical axis. For plot 702, the vertical axis shows whether the engine is operating in the first ignition mode ("first") or the second ignition mode ("second"). For plot 704, the vertical axis shows whether the valve position is fully open ("open") or fully closed ("closed").

At time t0, engine load (plot 708) is above the threshold engine load for operating in the first ignition mode (dashed line 712), but the engine temperature (plot 706) is below the threshold engine temperature for operating in the first ignition mode (dashed line 710). As a result, the engine operates in the second ignition mode (plot 702), which includes maintaining the pre-chamber valve in an open position (plot 704), such that the pre-chamber and the main combustion chamber of the cylinder form a combined combustion chamber. Further, operating in the second ignition mode includes combusting an air-fuel mixture in the combined combustion chamber via an ignition spark, as described in method 400. Between time t0 and time t1, the engine load (plot 706) remains relatively stable, and the engine temperature gradually increases (plot 706) while remaining below the threshold engine temperature for operating in the first ignition mode (dashed line 710). As a result, the engine continues to operate in the second ignition mode (plot 702), and the pre-chamber valve position remains open (plot 704).

At t1, the engine temperature (plot 706) increases above the threshold engine temperature for operating in the first ignition mode (dashed line 710), and the engine load (plot 708) remains above the threshold engine load for operating in the first ignition mode (dashed line 712). As a result, the engine transitions to operating in the first ignition mode (plot 702). Operating in the first ignition mode includes closing the pre-chamber valve (plot 704). When the pre-chamber valve is closed in the first ignition mode, the cylinder operates with pre-chamber ignition. In particular, a spark in the pre-chamber ignites a first air-fuel mixture in the pre-chamber, and jets of flame and hot gas from the pre-chamber ignite a second air-fuel mixture in the main combustion chamber. Between t1 and t2, the engine temperature (plot 706) remains higher than the threshold engine temperature for operating in the first ignition mode and the engine load (plot 708) remains above the threshold engine load for operating in the first ignition mode (plot 712). As a result, the ignition mode remains in the first ignition mode (plot 702) and the valve position remains closed (plot 704).

At time t2, the engine load (plot 708) falls below the threshold engine load for operating in the first ignition mode (dashed line 712), and in response, the engine transitions to operating in the second ignition mode (plot 702). As a result, the pre-chamber valve opens at time t2 (plot 704). As outlined in method 400 of FIG. 4, transitioning to the second ignition mode may include adjusting cylinder parameters such as a fuel injection timing, a fuel injection amount, and a spark timing. Between time t2 and time t3, the engine load (plot 708) remains below the threshold engine load for operating in the first ignition mode (dashed line 712), and as a result, the engine continues to operate in the second ignition mode (plot 702) with the pre-chamber valve open (plot 704).

At time t3, the engine load (plot 708) increases above the threshold engine load for operating in the first ignition mode (dashed line 712), and the engine temperature (plot 706) remains above the threshold engine temperature for operating in the first ignition mode (dashed line 710). In response, the engine transitions to operating in the first ignition mode (plot 702), including closing the pre-chamber valve (plot 704).

After time t3, the engine load (plot 708) remains above the threshold engine load for operating in the first ignition mode (dashed line 712), and the engine temperature (plot 706) remains above the threshold engine temperature for operating in the first ignition mode (dashed line 710). Accordingly, the engine continues to operate in the first ignition mode (plot 702) with the pre-chamber valve in the closed position (plot 704).

In this way, a pre-chamber valve position may be adjusted to transition between different ignition modes based on engine operating conditions in order to efficiently and reliably initiate combustion. In particular, by selecting between operating in a first ignition mode and a second ignition mode based on one or more engine operating conditions, such as engine load and/or engine temperature, the engine may transition between pre-chamber ignition (e.g., igniting an air-fuel mixture in the cylinder with jets of flame and hot gas from combustion in a pre-chamber) and spark ignition (e.g., igniting an air-fuel mixture in a combined combustion chamber formed from the pre-chamber and a main chamber of the cylinder with an ignition spark). The first ignition mode may increase a burn rate and an efficiency of the cylinder during engine operating conditions that increase combustion stability in the pre-chamber, such as higher engine loads and engine temperatures, while the second ignition mode ensures that cylinder ignition is reliably provided during conditions in which the combustion stability of the pre-chamber is expected to be relatively low. By providing both pre-chamber ignition and conventional spark ignition via a single spark plug in the pre-chamber, a number of components is reduced compared with systems that include pre-chamber air injection and/or additional spark plugs. Additionally, the pre-chamber valve enables a compression ratio of the cylinder to be varied, and decreasing the compression ratio during starting may decrease an amount of torsional work used to start the engine. Overall, providing an adjustable pre-chamber in the cylinder may increase combustion stability across a range of operating conditions without increasing a package size or complexity of the engine.

The technical effect of adjusting a valve to adjust an amount of fluid communication between a pre-chamber and a main combustion chamber based on engine operating conditions is that a single spark plug can provide pre-chamber ignition or direct main combustion chamber ignition depending on a position of the valve, thereby increasing combustion stability and reducing an occurrence of cylinder misfire and undesirable noise, vibration, and handling issues that may otherwise occur.

As an example, a method comprises: adjusting a valve coupled between a pre-chamber of an engine cylinder and a main chamber of the engine cylinder between an open position and a closed position based on at least one engine operating parameter. In the preceding example, additionally or optionally, the closed position is a fully closed position and includes a valve head of the valve in direct contact with a valve seat that at least partially divides the pre-chamber and the main chamber, and the open position is a fully open position that includes the valve head lifted from the valve seat. In one or both of the preceding examples, additionally or optionally, the valve seat includes a plurality of openings that fluidically couple the pre-chamber and the main chamber. In any or all of the preceding examples, additionally or optionally, the valve seat includes a plurality of grooves, each groove of the plurality of grooves forming a channel between the valve head and the valve seat that fluidically couples the pre-chamber and the main chamber when the valve is in the closed position. In any or all of the preceding examples, additionally or optionally, the at least one engine operating parameter includes an engine load, and adjusting the valve between the open position and the closed position based on the at least one engine operating parameter includes: adjusting the valve to the closed position responsive to the engine load exceeding a threshold load; and adjusting the valve to the open position responsive to the engine load decreasing below the threshold load. In any or all of the preceding examples, additionally or optionally, the at least one engine operating parameter includes an engine temperature, and adjusting the valve between the open position and the closed position based on the at least one engine operating parameter includes: adjusting the valve to the closed position responsive to the engine temperature exceeding a threshold temperature; and adjusting the valve to the open position responsive to the engine temperature decreasing below the threshold temperature. In any or all of the preceding examples, additionally or optionally, adjusting the valve to the open position responsive to the engine temperature decreasing below the threshold temperature includes adjusting the valve to the open position responsive to a cold start condition, prior to commencing combustion in the engine cylinder. In any or all of the preceding examples, additionally or optionally, the engine cylinder includes a spark plug coupled in the pre-chamber and no other spark plugs, and the method further comprises: determining a desired timing for actuating the spark plug using a pre-chamber ignition calibration responsive to adjusting the valve to the closed position; determining the desired timing for actuating the spark plug using a direct spark ignition calibration, different than the pre-chamber ignition calibration, responsive to adjusting the valve to the open position; and actuating the spark plug at the desired timing. In any or all of the preceding examples, additionally or optionally, the engine cylinder includes a first fuel injector coupled to the pre-chamber and a second fuel injector coupled to the main chamber, the first fuel injector and the second fuel injector coupled to a same high pressure fuel rail, and the method further comprises: injecting fuel in each of the pre-chamber and the main chamber by actuating the high pressure fuel rail.

As another example, a method comprises: transitioning between operating in a first ignition mode and a second ignition mode by adjusting a cross-sectional flow area between a pre-chamber of a cylinder and a main chamber of the cylinder via a valve. In the preceding example, additionally or optionally, the cross-sectional flow area is smaller while operating in the first ignition mode than while operating in the second ignition mode. In one or both of the preceding examples, additionally or optionally, transitioning between operating in the first ignition mode and the second ignition mode includes: transitioning from operating in the first ignition mode to operating in the second ignition mode by adjusting the valve from a fully closed position to a fully open position responsive to at least one of an engine temperature decreasing below a threshold engine temperature and the engine load decreasing below a threshold engine load; and transitioning from operating in the second ignition mode to operating in the first ignition mode by adjusting the valve from the fully open position to the fully closed position responsive to at least one of the engine temperature increasing above the threshold engine temperature and the engine load increasing above the threshold engine load. In any or all of the preceding examples, additionally or optionally, in the fully closed position, a valve head of the valve is in direct, face-sharing contact with a valve seat forming a wall separating the pre-chamber and the main chamber, the valve seat including a plurality of flow passages between the pre-chamber and the main chamber, and, in the fully open position, the valve head is not in direct, face-sharing contact with the valve seat. In any or all of the preceding examples, additionally or optionally, operating in the first ignition mode includes igniting a first air-fuel mixture in the pre-chamber via an ignition spark from a spark plug coupled within the pre-chamber to produce a pre-chamber combustion event, the pre-chamber combustion event igniting a second air-fuel mixture in the main chamber; and operating in the second ignition mode includes igniting a shared air-fuel mixture diffused throughout the pre-chamber and the main chamber via the ignition spark from the spark plug coupled within the pre-chamber. In any or all of the preceding examples, additionally or optionally, operating in the second ignition mode includes further opening a throttle positioned in an intake of the engine compared with operating in the first ignition mode for a same demanded torque.

As yet another example, a system comprises: an engine including a cylinder, the cylinder including a pre-chamber and a main chamber; a spark plug coupled to the pre-chamber; a poppet valve positioned at least partially within the pre-chamber, a valve seat for the poppet valve coupled between the pre-chamber and the main chamber; and a controller storing executable instructions in non-transitory memory that, when executed, cause the controller to: actuate the poppet valve to a fully closed position responsive to conditions for operating with pre-chamber ignition; and actuate the poppet valve to a fully open position responsive to conditions for operating with spark ignition. In the preceding example, additionally or optionally, the valve seat includes a central opening through which the poppet valve extends and a plurality of orifices arranged radially around the central opening; the pre-chamber is fluidically coupled to the main chamber via only the plurality of orifices when the poppet valve in the fully closed position; and the pre-chamber is fluidically coupled to the main chamber via the plurality of orifices and the central opening when the poppet valve is in the fully open position. In one or both of the preceding examples, the system additionally or optionally further comprises: an electro-hydraulic system including a solenoid configured to adjust an oil pressure to actuate the poppet valve, and wherein the controller includes further instructions stored in non-transitory memory that, when executed, cause the controller to: actuate the solenoid to decrease the oil pressure below a threshold pressure for opening the poppet valve to actuate the poppet valve to the fully closed position; and actuate the solenoid to increase the oil pressure above the threshold pressure to actuate the poppet valve to the fully open position. In any or all of the preceding examples, additionally or optionally, the controller includes further instructions stored in non-transitory memory that, when executed, cause the controller to: operate with pre-chamber ignition, including igniting an air-fuel mixture in the pre-chamber via a spark from the spark plug, the ignited air-fuel mixture in the pre-chamber further igniting an air-fuel mixture in the main chamber, responsive to the conditions for operating with pre-chamber ignition; and operate with spark ignition, including igniting an air-fuel mixture in the main chamber directly via the spark from the spark plug, responsive to the conditions for operating with spark ignition. In any or all of the preceding examples, additionally or optionally, the conditions for operating with pre-chamber ignition include an engine load being above a threshold engine load and an engine temperature being above a threshold engine temperature, and the conditions for operating with spark ignition include the engine load being below the threshold engine load and the engine temperature being below the threshold engine temperature.

In another representation, a method comprises: responsive to an engine temperature below a threshold engine temperature, actuating a high pressure fuel rail coupled to a first injector and a second injector at a first pressure, the first injector coupled to a pre-chamber of a cylinder and the second injector directly to the cylinder. In the preceding example, the method additionally or optionally further comprises: responsive to the engine temperature above the threshold engine temperature, actuating the high pressure fuel rail at a second pressure, the second pressure lower relative to the first pressure. In one or both of the preceding examples, additionally or optionally, the threshold engine temperature is a temperature below which a cold start condition is assumed. In any or all of the preceding examples, the method additionally or optionally further comprises: responsive to the engine temperature below the threshold engine temperature, maintaining a valve disposed between the pre-chamber and the combustion chamber in an open position; and responsive to the engine temperature above the threshold engine temperature, maintaining the valve in a closed position. In any or all of the preceding examples, additionally or optionally, when the valve is in the open position, the pre-chamber and the combustion chamber are fluidically coupled by a first cross-sectional flow area, and when the valve is in the closed position, the pre-chamber and the combustion chamber are fluidically coupled via second cross-sectional flow area, the second cross-sectional flow area less than the first cross-sectional flow area. In any or all of the preceding examples, additionally or optionally, the engine cylinder includes a spark plug coupled in the pre-chamber and no other spark plugs, and the method further comprises: determining a desired timing for actuating the spark plug using a pre-chamber ignition calibration responsive to adjusting the valve to the closed position; determining the desired timing for actuating the spark plug using a direct spark ignition calibration, different than the pre-chamber ignition calibration, responsive to adjusting the valve to the open position; and actuating the spark plug at the desired timing.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

FIG. 2A-3C shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    adjusting a valve coupled between a pre-chamber of an engine cylinder and a main chamber of the engine cylinder between an open position and a closed position based on at least one engine operating parameters;
    operating with pre-chamber ignition comprising: when the valve is in the closed position, igniting an air-fuel mixture in the pre-chamber via a spark from a spark plug coupled to the pre-chamber, the ignited air-fuel mixture in the pre-chamber further igniting an air-fuel mixture in the main chamber; and
    operating with spark ignition comprising: when the valve is in the open position, igniting an air-fuel mixture in the main chamber via the spark from the spark plug.

2. The method of claim 1, wherein the closed position is a fully closed position and includes a valve head of the valve in direct contact with a valve seat that at least partially divides the pre-chamber and the main chamber, and the open position is a fully open position that includes the valve head lifted from the valve seat.

3. The method of claim 2, wherein the valve seat includes a plurality of openings that fluidically couple the pre-chamber and the main chamber.

4. The method of claim 2, wherein the valve seat includes a plurality of grooves, each groove of the plurality of grooves forming a channel between the valve head and the valve seat that fluidically couples the pre-chamber and the main chamber when the valve is in the closed position.

5. The method of claim 1, wherein the at least one engine operating parameter includes an engine load, and adjusting the valve between the open position and the closed position based on the at least one engine operating parameter includes:
    adjusting the valve to the closed position responsive to the engine load exceeding a threshold load; and
    adjusting the valve to the open position responsive to the engine load decreasing below the threshold load.

6. The method of claim 1, wherein the at least one engine operating parameter includes an engine temperature, and adjusting the valve between the open position and the closed position based on the at least one engine operating parameter includes:
    adjusting the valve to the closed position responsive to the engine temperature exceeding a threshold temperature; and
    adjusting the valve to the open position responsive to the engine temperature decreasing below the threshold temperature.

7. The method of claim 6, wherein adjusting the valve to the open position responsive to the engine temperature decreasing below the threshold temperature includes adjusting the valve to the open position responsive to a cold start condition, prior to commencing combustion in the engine cylinder.

8. The method of claim 1, wherein the engine cylinder includes a spark plug coupled in the pre-chamber and no other spark plugs, and the method further comprises:
    determining a desired timing for actuating the spark plug using a pre-chamber ignition calibration responsive to adjusting the valve to the closed position;
    determining the desired timing for actuating the spark plug using a direct spark ignition calibration, different than the pre-chamber ignition calibration, responsive to adjusting the valve to the open position; and
    actuating the spark plug at the desired timing.

9. The method of claim 1, wherein the engine cylinder includes a first fuel injector coupled to the pre-chamber and a second fuel injector coupled to the main chamber, the first fuel injector and the second fuel injector coupled to a same high pressure fuel rail, and the method further comprises:
    injecting fuel in each of the pre-chamber and the main chamber by actuating the high pressure fuel rail.

10. A method for an engine, comprising:
    transitioning between operating in a first ignition mode and a second ignition mode by adjusting a cross-sectional flow area between a pre-chamber of a cylinder and a main chamber of the cylinder via a valves;
    operating in the first ignition mode includes igniting a first air-fuel mixture in the pre-chamber via an ignition spark from a spark plug coupled within the pre-chamber to produce a pre-chamber combustion event, the pre-chamber combustion event igniting a second air-fuel mixture in the main chamber; and
    operating in the second ignition mode includes:
        igniting a shared air-fuel mixture diffused throughout the pre-chamber and the main chamber via the ignition spark from the spark plug, and
        opening a throttle positioned in an intake of the engine compared with operating in the first ignition mode.

11. The method of claim 10, wherein the cross-sectional flow area is smaller while operating in the first ignition mode than while operating in the second ignition mode.

12. The method of claim 11, wherein transitioning between operating in the first ignition mode and the second ignition mode includes:
    transitioning from operating in the first ignition mode to operating in the second ignition mode by adjusting the valve from a fully closed position to a fully open position responsive to at least one of an engine temperature decreasing below a threshold engine temperature and the engine load decreasing below a threshold engine load; and
    transitioning from operating in the second ignition mode to operating in the first ignition mode by adjusting the valve from the fully open position to the fully closed position responsive to at least one of the engine temperature increasing above the threshold engine temperature and the engine load increasing above the threshold engine load.

13. The method of claim 12, wherein, in the fully closed position, a valve head of the valve is in direct, face-sharing contact with a valve seat forming a wall separating the pre-chamber and the main chamber, the valve seat including a plurality of flow passages between the pre-chamber and the main chamber, and, in the fully open position, the valve head is not in direct, face-sharing contact with the valve seat.

14. A system, comprising:
an engine including a cylinder, the cylinder including a pre-chamber and a main chamber;
a spark plug coupled to the pre-chamber;
a poppet valve positioned at least partially within the pre-chamber, a valve seat for the poppet valve coupled between the pre-chamber and the main chamber; and
a controller storing executable instructions in non-transitory memory that, when executed, cause the controller to:
actuate the poppet valve to a fully closed position and operate with pre-chamber ignition, including igniting an air-fuel mixture in the pre-chamber via a spark from the spark plug, the ignited air-fuel mixture in the pre-chamber further igniting an air-fuel mixture in the main chamber, responsive to conditions for operating with pre-chamber ignition; and
actuate the poppet valve to a fully open position and operate with spark ignition, including igniting an air-fuel mixture in the main chamber directly via the spark from the spark plug, responsive to conditions for operating with spark ignition.

15. The system of claim 14, wherein:
the valve seat includes a central opening through which the poppet valve extends and a plurality of orifices arranged radially around the central opening;
the pre-chamber is fluidically coupled to the main chamber via only the plurality of orifices when the poppet valve in the fully closed position; and
the pre-chamber is fluidically coupled to the main chamber via the plurality of orifices and the central opening when the poppet valve is in the fully open position.

16. The system of claim 14, further comprising an electro-hydraulic system including a solenoid configured to adjust an oil pressure to actuate the poppet valve, and wherein the controller includes further instructions stored in non-transitory memory that, when executed, cause the controller to:
actuate the solenoid to decrease the oil pressure below a threshold pressure for opening the poppet valve to actuate the poppet valve to the fully closed position; and
actuate the solenoid to increase the oil pressure above the threshold pressure to actuate the poppet valve to the fully open position.

17. The system of claim 14, wherein the conditions for operating with pre-chamber ignition include an engine load being above a threshold engine load and an engine temperature being above a threshold engine temperature, and the conditions for operating with spark ignition include the engine load being below the threshold engine load and the engine temperature being below the threshold engine temperature.

* * * * *